US012122399B2

(12) United States Patent
Ukai

(10) Patent No.: US 12,122,399 B2
(45) Date of Patent: Oct. 22, 2024

(54) VEHICLE POWER SUPPLY SYSTEM

(71) Applicant: HONDA MOTOR CO., LTD., Tokyo (JP)

(72) Inventor: Hayahito Ukai, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 197 days.

(21) Appl. No.: 17/991,270

(22) Filed: Nov. 21, 2022

(65) Prior Publication Data

US 2023/0166748 A1  Jun. 1, 2023

(30) Foreign Application Priority Data

Nov. 29, 2021  (JP) .................................. 2021-192982

(51) Int. Cl.
| | |
|---|---|
| B60W 50/02 | (2012.01) |
| B60R 16/03 | (2006.01) |
| B60R 16/033 | (2006.01) |
| B60W 50/023 | (2012.01) |
| B60W 50/14 | (2020.01) |
| B60W 60/00 | (2020.01) |
| H02J 9/06 | (2006.01) |

(52) U.S. Cl.
CPC ......... *B60W 50/023* (2013.01); *B60R 16/033* (2013.01); *B60W 50/14* (2013.01); *B60W 60/005* (2020.02); *H02J 9/06* (2013.01); *B60W 2710/242* (2013.01)

(58) Field of Classification Search
CPC .. B60W 50/023; B60W 50/14; B60W 60/005; B60W 2710/242; B60R 16/033; B60R 16/03; H02J 9/06; H02J 7/0048; H02J 7/0063
See application file for complete search history.

(56) References Cited

U.S. PATENT DOCUMENTS

| | | |
|---|---|---|
| 2017/0349048 A1 | 12/2017 | Nakayama et al. |
| 2020/0238832 A1 | 7/2020 | Nakayama et al. |
| 2022/0041059 A1 | 2/2022 | Nakayama et al. |

FOREIGN PATENT DOCUMENTS

JP     2017-218013 A     12/2017

*Primary Examiner* — Rodney A Butler
(74) *Attorney, Agent, or Firm* — Paratus Law Group, PLLC

(57) ABSTRACT

A vehicle power supply system includes a main power supply system including a main low-voltage power supply and a normal load; and a backup power supply system including a backup low-voltage power supply and an emergency important load. The backup power supply system includes a backup power supply control device. The backup power supply control device executes a suppliable electrical energy estimation process of estimating suppliable electrical energy suppliable from the backup low-voltage power supply to the emergency important load. The backup power supply control device outputs a signal based on a first electrical energy threshold value and a second electrical energy threshold value.

12 Claims, 4 Drawing Sheets

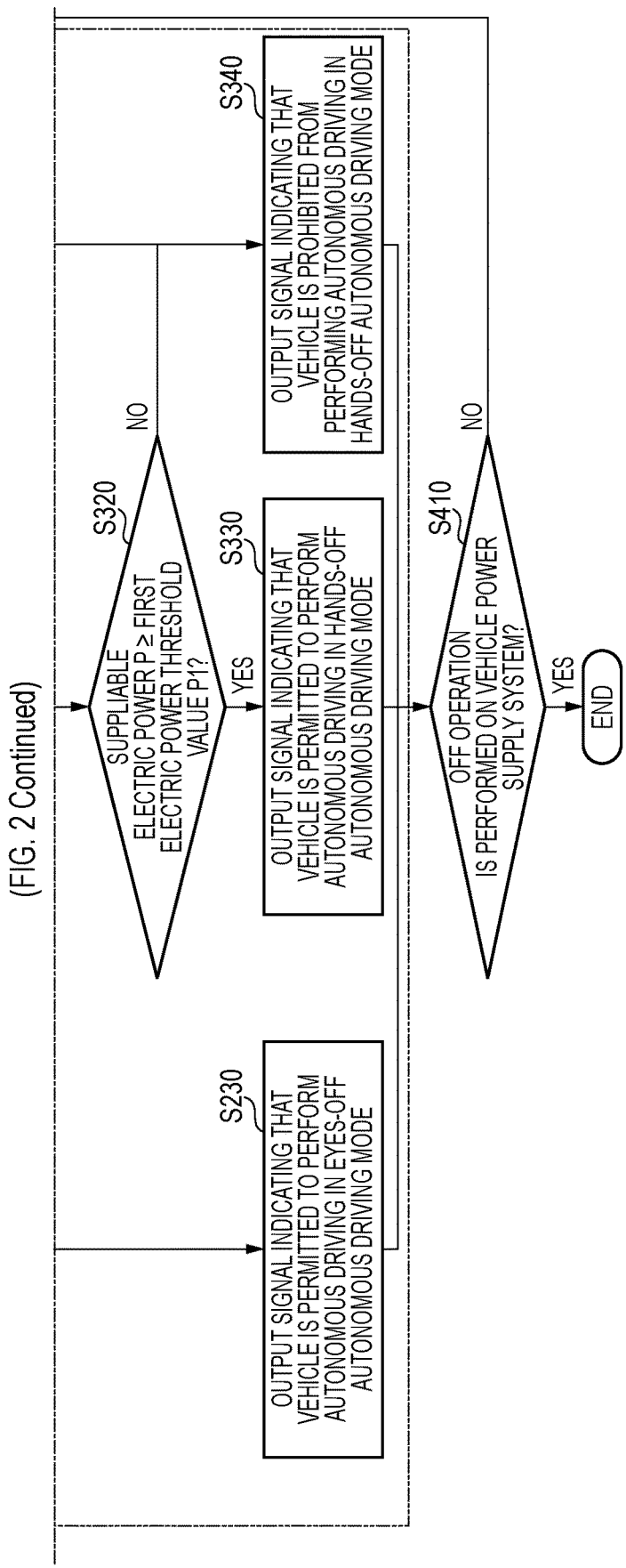

VEHICLE POWER SUPPLY SYSTEM

CROSS-REFERENCE TO RELATED APPLICATION

The present application claims priority from Japanese Patent Application No. 2021-192982 filed on Nov. 29, 2021, the entire content of which is incorporated herein by reference.

TECHNICAL FIELD

The present invention relates to a vehicle power supply system mounted on a vehicle. In particular, the present invention relates to a vehicle power supply system mounted on a vehicle capable of performing at least partial autonomous driving.

BACKGROUND ART

In recent years, it is required to improve traffic safety in order to make cities and human settlements inclusive, safe, resilient and sustainable. In a vehicle, from the viewpoint of improving traffic safety, for example, it is required to ensure traffic safety even when an abnormality occurs in the vehicle.

There is known a vehicle power supply system in which electric power is supplied from a backup low-voltage power supply to a specific important load when an abnormality occurs in a main low-voltage power supply, so that the electric power supplied to the specific important load can be continued, and even when an abnormality occurs in the main low-voltage power supply, traffic safety can still be ensured (for example, see JP2017-218013A).

In addition, in recent years, research and development of advanced autonomous driving techniques for vehicles have rapidly progressed. There is known a vehicle that has a plurality of autonomous driving modes whose degrees of autonomous driving are different depending on a degree of duty required of a driver of the vehicle, and the vehicle is capable of performing autonomous driving in the plurality of autonomous driving modes.

SUMMARY

In the vehicle power supply system disclosed in JP2017-218013A, in order to reliably supply electric power from the backup low-voltage power supply to the specific important load when an abnormality occurs in the main low-voltage power supply, it is preferable to estimate or detect in advance whether the backup low-voltage power supply is in a state in which the backup low-voltage power supply supplies electric power to the specific important load.

On the other hand, in a vehicle capable of performing autonomous driving in a plurality of autonomous driving modes, a minimum time necessary for continuing autonomous driving in an autonomous driving mode and a minimum load necessary for continuing autonomous driving in the autonomous driving mode are different depending on the autonomous driving mode in order to ensure traffic safety.

Therefore, in a case where the vehicle power supply system disclosed in JP2017-218013A is mounted on a vehicle capable of performing autonomous driving in a plurality of autonomous driving modes, when an abnormality occurs in the main low-voltage power supply, minimum electrical energy and minimum electric power required of the backup low-voltage power supply are different depending on an autonomous driving mode in which the vehicle performs autonomous driving.

In order to ensure traffic safety, it is necessary for the backup low-voltage power supply to be capable of supplying required electrical energy and required electric power regardless of which autonomous driving mode the vehicle performs autonomous driving in when an abnormality occurs in the main low-voltage power supply. At this time, if the backup low-voltage power supply can supply maximum electrical energy or electric power among the required minimum electrical energy or electric power necessary for continuing autonomous driving for a necessary minimum time in each autonomous driving mode, the battery low-voltage power supply can supply the required electrical energy or electric power regardless of which autonomous driving mode the vehicle performs autonomous driving in, and thus the traffic safety can be ensured.

However, if autonomous driving of the vehicle is collectively permitted only when the backup low-voltage power supply can supply the maximum electrical energy or electric power among the required minimum electrical energy or electric power necessary for continuing autonomous driving for the necessary minimum time in each autonomous driving mode, autonomous driving of the vehicle in a predetermined autonomous driving mode may be prohibited even though the battery low-voltage power supply can supply the necessary minimum electrical energy or electric power required of the backup low-voltage power supply in order to continue the autonomous driving for the necessary minimum time in the predetermined autonomous driving mode.

The present invention provides a vehicle power supply system capable of individually permitting autonomous driving of a vehicle in a first autonomous driving mode and autonomous driving of the vehicle in a second autonomous driving mode according to suppliable electrical energy and/or suppliable electric power of a backup low-voltage power supply.

According to a first aspect of the present invention, there is provided a vehicle power supply system mounted on a vehicle enabling at least partial autonomous driving in a first autonomous driving mode that permits exemption from a steering operation performed by a driver and prohibits exemption from constant monitoring of a driving condition of the vehicle and a surrounding condition of the vehicle performed by the driver, and a second autonomous driving mode that permits the exemption from the steering operation performed by the driver and permits the exemption from the constant monitoring of the driving condition of the vehicle and the surrounding condition of the vehicle performed by the driver. The vehicle power supply system includes a main power supply system including a main low-voltage power supply and a normal load, and a backup power supply system including a backup low-voltage power supply and an emergency important load and being connected to the main power supply system. The backup power supply system includes a backup power supply control device configured to monitor a state of the backup low-voltage power supply and control electric power input to and output from the backup low-voltage power supply. The backup power supply control device is capable of executing a suppliable electrical energy estimation process of estimating suppliable electrical energy suppliable from the backup low-voltage power supply to the emergency important load. The backup power supply control device outputs a signal based on a first electrical energy threshold value that is electrical energy equal to or greater than electrical energy necessary for operating the emergency important load when the vehicle performs autonomous driving in the first autonomous driving mode, and a second electrical energy threshold value that is electrical energy equal to or greater than electrical energy necessary for operating the emergency important load when the vehicle performs autonomous driving in the second autonomous driving mode. The backup power supply control device outputs, when the suppliable electrical energy estimated in the suppliable electrical energy estimation process is equal to or greater than the first electrical energy threshold value, a signal indicating that the vehicle is permitted to perform autonomous driving in the first autonomous driving mode. The backup power supply control device outputs, when the suppliable electrical energy estimated in the suppliable electrical energy estimation process is equal to or greater than the second electrical energy threshold value, a signal indicating that the vehicle is permitted to perform autonomous driving in the second autonomous driving mode.

According to a first aspect of the present invention, there is provided a vehicle power supply system mounted on a vehicle enabling at least partial autonomous driving in a first autonomous driving mode that permits exemption from a steering operation performed by a driver and prohibits exemption from constant monitoring of a driving condition of the vehicle and a surrounding condition of the vehicle performed by the driver, and a second autonomous driving mode that permits the exemption from the steering operation performed by the driver and permits the exemption from the constant monitoring of the driving condition of the vehicle and the surrounding condition of the vehicle performed by the driver. The vehicle power supply system includes a main power supply system including a main low-voltage power supply and a normal load, and a backup power supply system including a backup low-voltage power supply and an emergency important load and being connected to the main power supply system. The backup power supply system includes a backup power supply control device configured to monitor a state of the backup low-voltage power supply and control electric power input to and output from the backup low-voltage power supply. The backup power supply control device is capable of executing a suppliable electric power estimation process of estimating suppliable electric power suppliable from the backup low-voltage power supply to the emergency important load. The backup power supply control device outputs a signal based on a first electric power threshold value that is electric power equal to or greater than electric power necessary for operating the emergency important load when the vehicle performs autonomous driving in the first autonomous driving mode, and a second electric power threshold value that is electric power equal to or greater than electric power necessary for operating the emergency important load when the vehicle performs autonomous driving in the second autonomous driving mode. The backup power supply control device outputs, when the suppliable electric power estimated in the suppliable electric power estimation process is equal to or greater than the first electric power threshold value, a signal indicating that the vehicle is permitted to perform autonomous driving in the first autonomous driving mode. The backup power supply control device outputs, when the suppliable electric power estimated in the suppliable electric power estimation process is equal to or greater than the second electric power threshold value, a signal indicating that the vehicle is permitted to perform autonomous driving in the second autonomous driving mode.

According to a first aspect of the present invention, there is provided a vehicle power supply system mounted on a vehicle enabling at least partial autonomous driving in a first autonomous driving mode that permits exemption from a steering operation performed by a driver and prohibits exemption from constant monitoring of a driving condition of the vehicle and a surrounding condition of the vehicle performed by the driver, and a second autonomous driving mode that permits the exemption from the steering operation performed by the driver and permits the exemption from the constant monitoring of the driving condition of the vehicle and the surrounding condition of the vehicle performed by the driver. The vehicle power supply system includes a main power supply system including a main low-voltage power supply and a normal load, and a backup power supply system including a backup low-voltage power supply and an emergency important load and being connected to the main power supply system. The backup power supply system includes a backup power supply control device configured to monitor a state of the backup low-voltage power supply and control electric power input to and output from the backup low-voltage power supply. The backup power supply control device is capable of executing a suppliable electrical energy estimation process of estimating suppliable electrical energy suppliable from the backup low-voltage power supply to the emergency important load, and a suppliable electric power estimation process of estimating suppliable electric power suppliable from the backup low-voltage power supply to the emergency important load. The backup power supply control device outputs a signal based on a first electrical energy threshold value that is electrical energy equal to or greater than electrical energy necessary for operating the emergency important load when the vehicle performs autonomous driving in the first autonomous driving mode, a second electrical energy threshold value that is electrical energy equal to or greater than electrical energy necessary for operating the emergency important load when the vehicle performs autonomous driving in the second autonomous driving mode, a first electric power threshold value that is electric power equal to or greater than electric power necessary for operating the emergency important load when the vehicle performs autonomous driving in the first autonomous driving mode, and a second electric power threshold value that is electric power equal to or greater than electric power necessary for operating the emergency important load when the vehicle performs autonomous driving in the second autonomous driving mode. The backup power supply control device outputs, when the suppliable electrical energy estimated in the suppliable electrical energy estimation process is equal to or greater than the first electrical energy threshold value and the suppliable electric power estimated in the suppliable electric power estimation process is equal to or greater than the first electric power threshold value, a signal indicating that the vehicle is permitted to perform autonomous driving in the first autonomous driving mode. The backup power supply control device outputs, when the suppliable electrical energy estimated in the suppliable electrical energy estimation process is equal to or greater than the second electrical energy threshold value and the suppliable electric power estimated in the suppliable electric power estimation process is equal to or greater than the second electric power threshold value, a signal indicating that the vehicle is permitted to perform autonomous driving in the second autonomous driving mode.

According to the present invention, a condition under which the vehicle is permitted to perform autonomous driving in the first autonomous driving mode and a condition under which the vehicle is permitted to perform autonomous driving in the second autonomous driving mode are separated from each other. Accordingly, the backup power supply control device can individually permit autonomous driving of the vehicle in the first autonomous driving mode and autonomous driving of the vehicle in the second autonomous driving mode according to the suppliable electrical energy and/or the suppliable electric power of the backup low-voltage power supply.

DESCRIPTION OF EMBODIMENTS

Hereinafter, a vehicle on which a vehicle power supply system according to an embodiment of the present invention is mounted will be described with reference to the accompanying drawings.

[Overall Configuration of Vehicle Power Supply System]

Figure 1:
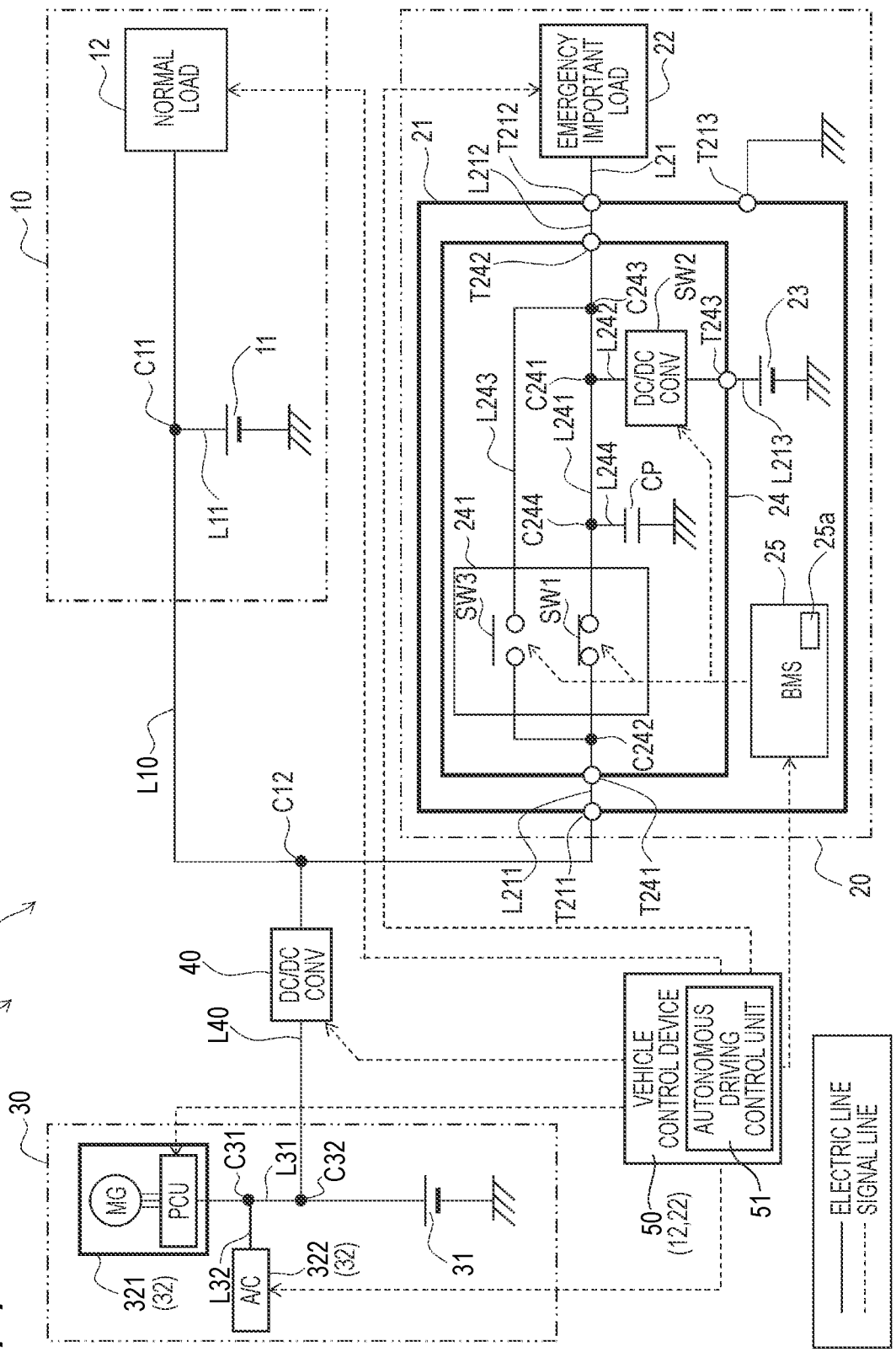
FIG. 1 is a schematic configuration diagram showing a vehicle power supply system according to an embodiment of the present invention.

As shown in FIG. 1, a vehicle power supply system 1 according to the present embodiment is mounted on a vehicle V. The vehicle power supply system 1 includes a main power supply system 10, a backup power supply system 20 connected to the main power supply system 10, a high-voltage power supply system 30, and a step-down device 40. The high-voltage power supply system 30 is connected to the main power supply system 10 and the backup power supply system 20 via the step-down device 40. The step-down device 40 steps down electric power flowing through the high-voltage power supply system 30. The step-down device 40 is, for example, a DC-to-DC converter.

The vehicle V on which the vehicle power supply system 1 is mounted is mounted with a drive unit 321 including a rotary electric machine MG to be described later, and a high-voltage power supply 31 that supplies electric power for driving the drive unit 321. The vehicle V is a vehicle that can be driven by power of the rotary electric machine MG driven by the electric power of the high-voltage power supply 31. The vehicle V may also be mounted with an internal combustion engine. The internal combustion engine may function as a power source that drives the vehicle V together with the rotary electric machine MG of the drive unit 321, or may function as a power source that drives a generator (not shown) generating electric power for driving the rotary electric machine MG of the drive unit 321. That is, the vehicle V may be an electric vehicle that does not include any internal combustion engine, or may be a hybrid vehicle that includes the internal combustion engine and the rotary electric machine MG for driving the vehicle.

The vehicle V is a vehicle capable of performing at least partial autonomous driving under a specific condition. Hereinafter, in the present specification and the like, autonomous driving includes not only so-called complete autonomous driving in which the vehicle V performs all driving tasks in any place and in any situation, but also partial autonomous driving in which the vehicle V performs a part or all driving tasks in a specific place and in a specific situation.

The vehicle V includes a vehicle control device 50. The vehicle control device 50 includes a large number of electronic control units (ECUs), and can perform driving control of the vehicle V.

The vehicle control device 50 includes an autonomous driving control unit 51 that controls autonomous driving of the vehicle V. The autonomous driving control unit 51 has a hands-off autonomous driving mode that permits exemption from a steering operation performed by a driver of the vehicle V and prohibits exemption from constant monitoring of a driving condition of the vehicle and a surrounding condition of the vehicle performed by the driver of the vehicle V, and an eyes-off autonomous driving mode that permits the exemption from the steering operation performed by the driver of the vehicle V and permits the exemption from the constant monitoring of the driving condition of the vehicle and the surrounding condition of the vehicle performed by the driver of the vehicle V. That is, the autonomous driving control unit 51 can control the autonomous driving of the vehicle V in the hands-off autonomous driving mode that permits the exemption from the steering operation performed by the driver of the vehicle V and prohibits the exemption from the constant monitoring of the driving condition of the vehicle and the surrounding condition of the vehicle performed by the driver of the vehicle V, and can control the autonomous driving of the vehicle V in the eyes-off autonomous driving mode that permits the exemption from the steering operation performed by the driver of the vehicle V and permits the exemption from the constant monitoring of the driving condition of the vehicle and the surrounding condition of the vehicle performed by the driver of the vehicle V. Therefore, the vehicle V can perform the autonomous driving in the hands-off autonomous driving mode that permits the exemption from the steering operation performed by the driver of the vehicle V and prohibits the exemption from the constant monitoring of the driving condition of the vehicle and the surrounding condition of the vehicle performed by the driver of the vehicle V, and can perform the autonomous driving in the eyes-off autonomous driving mode that permits the exemption from the steering operation performed by the driver of the vehicle V and permits the exemption from the constant monitoring of the driving condition of the vehicle and the surrounding condition of the vehicle performed by the driver of the vehicle V.

In the hands-off autonomous driving mode, the autonomous driving control unit 51 performs forward recognition of the vehicle V including a position of a preceding vehicle, presence or absence of a pedestrian, and the like, and performs steering control and acceleration and deceleration control of the vehicle V. In the eyes-off autonomous driving mode, the autonomous driving control unit 51 performs high-precision external recognition including recognition of front, rear, left, and right of the vehicle V, formulation of a movement path of the vehicle V, and overall driving control of the vehicle V including steering control and acceleration and deceleration control of the vehicle V in order to drive the vehicle V along the formulated movement path.

<Main Power Supply System>

The main power supply system 10 includes a main low-voltage power supply 11 and a normal load 12.

The main low-voltage power supply 11 is, for example, a secondary battery such as a lithium ion battery or a lead battery. The main low-voltage power supply 11 outputs electric power having a voltage of, for example, 12 [V].

The main low-voltage power supply 11 is provided on a connection line L11. One end portion of the connection line L11 is connected to a contact C11 formed on a connection line L10, and the other end portion of the connection line L11 is connected to a ground line having a reference potential of the vehicle power supply system 1. A positive electrode side of the main low-voltage power supply 11 is connected to the contact C11 side of the connection line L11, and a negative electrode side of the main low-voltage power supply 11 is connected to the ground line side of the connection line L11.

The normal load 12 includes a load having a function related to a traveling operation, a stopping operation, or driving control of the vehicle V. The normal load 12 includes at least one of an auxiliary load used for braking the vehicle V, such as an automatic brake device, an auxiliary load used for steering the vehicle V, such as an automatic steering device, an auxiliary load used for acquiring external information of the vehicle V, such as light detection and ranging (LiDAR), a wiper device, a power window device, and measuring instruments. Further, the normal load 12 includes the vehicle control device 50 described above.

The normal load 12 is connected to one end portion of the connection line L10.

<Backup Power Supply System>

The backup power supply system 20 includes a backup power supply unit 21 and an emergency important load 22.

The backup power supply unit 21 includes a backup low-voltage power supply 23, a switching device 24, and a backup power supply control device 25 that monitors a state of the backup low-voltage power supply 23 and controls the switching device 24.

The backup power supply unit 21 includes a first external connection terminal T211, a second external connection terminal T212, and a ground terminal T213. The other end portion of the connection line L10 is connected to the first external connection terminal T211. The ground terminal T213 is connected to the ground line.

The emergency important load 22 includes a load having a function related to the traveling operation, the stopping operation, or the driving control of the vehicle V. The emergency important load 22 is a load having a function related to execution of a minimum necessary traveling operation, a minimum necessary stopping operation, and minimum necessary driving control, namely emergency stop assist (ESA), in order to safely move the vehicle V to a road shoulder of a road and stop the vehicle V even when a drive force of a drive source is lost. The emergency important load 22 includes at least one of an auxiliary load used for braking the vehicle V, such as an automatic brake device, an auxiliary load used for steering the vehicle V, such as an automatic steering device, and an auxiliary load used for acquiring external information of the vehicle V, such as light detection and ranging (LiDAR).

The emergency important load 22 of the backup power supply system 20 and the normal load 12 of the main power supply system 10 may have a part of functions thereof overlapping with each other. In addition, the emergency important load 22 may be a load that overlaps with a part of the normal load 12 of the main power supply system 10. In this way, the emergency important load 22 can be made redundant and multiplexed. In other words, the overlapping functions between the normal load 12 of the main power supply system 10 and the emergency important load 22 can be operated by the main power supply system 10 and can also be operated by the backup power supply system 20. Accordingly, the overlapping functions between the normal load 12 of the main power supply system 10 and the emergency important load 22 can be operated even when an abnormality occurs in the main power supply system 10, and can be operated even when an abnormality occurs in the backup power supply system 20.

The emergency important load 22 is connected to the second external connection terminal T212 of the backup power supply unit 21 by a connection line L21.

The switching device 24 includes a first terminal T241, a second terminal T242, and a third terminal T243. The first terminal T241 is connected to the first external connection terminal T211 of the backup power supply unit 21 by a connection line L211. The second terminal T242 is connected to the second external connection terminal T212 of the backup power supply unit 21 by a connection line L212.

The switching device 24 includes a connection line L241 that connects the first terminal T241 and the second terminal T242. The connection line L241 is provided with a first switch SW1. In the present embodiment, the first switch SW1 is a switch having a normally open (N.O.) contact. The normally open contact is a contact that maintains the first switch SW1 in an OFF state and maintains the connection line L241 in a disconnected state when no operation signal is applied to the first switch SW1. Specifically, in the case of an electromagnetic switch (for example, an electromagnetic contactor or an electromagnetic switch) in which an operation force is an electromagnetic force, when no electromagnetic force is generated by an operation current, the first switch SW1 is maintained in the OFF state and the connection line L241 is maintained in the disconnected state. The first switch SW1 is, for example, a semiconductor switch.

The switching device 24 includes a connection line L242 that connects the connection line L241 and the third terminal T243. One end portion of the connection line L242 is connected to the connection line L241 at a contact C241 formed between the first switch SW1 and the second terminal T242 on the connection line L241, and the other end portion of the connection line L242 is connected to the third terminal T243. The connection line L242 is provided with a second switch SW2. In the present embodiment, the second switch SW2 is a DC-to-DC converter. The second switch SW2 maintains the connection line L242 in a connected state when the second switch SW2 is in an ON state, and maintains the connection line L242 in a disconnected state when the second switch SW2 is in an OFF state. Further, since the second switch SW2 is a DC-to-DC converter, a voltage of electric power flowing through the connection line L242 can be stepped up or stepped down when the second switch SW2 is in the ON state. In this way, the second switch SW2 can switch the connection line L242 between the connected state and the disconnected state, and can step up or step down the voltage of the electric power flowing through the connection line L242 when the connection line L242 is in the connected state.

The switching device 24 includes a connection line L243 connected in parallel to the connection line L241. One end portion of the connection line L243 is connected to a contact C242 formed between the first terminal T241 and the first switch SW1 on the connection line L241, and the other end portion of the connection line L243 is connected to a contact C243 formed between the contact C241 and the second terminal T242 on the connection line L241. The connection line L243 is provided with a third switch SW3. In the present embodiment, the third switch SW3 is a switch having a normally closed (N.C.) contact. The normally closed contact is a contact that maintains the third switch SW3 in an ON state and maintains the connection line L243 in a connected state when no operation signal is applied to the third switch SW3. Specifically, in the case of an electromagnetic switch (for example, an electromagnetic contactor or an electromagnetic switch) in which an operation force is an electromagnetic force, when no electromagnetic force is generated by an operation current, the third switch SW3 is maintained in the ON state and the connection line L243 is maintained in the connected state. The third switch SW3 is, for example, a semiconductor switch.

In this way, the first switch SW1 having the normally open contact and the third switch SW3 having the normally closed contact are provided in parallel in the backup power supply system 20.

When at least one of the first switch SW1 and the third switch SW3 is in the ON state, the backup power supply system 20 is connected to the main power supply system 10, electric power of the backup low-voltage power supply 23 can be supplied to the main power supply system 10, and electric power can be supplied from the main power supply system 10 to the emergency important load 22. On the other hand, when both the first switch SW1 and the third switch SW3 are in the OFF state, the backup power supply system 20 is disconnected from the main power supply system 10.

Therefore, even in a state in which no electric power is supplied to the backup power supply control device 25, electric power can be supplied from the main power supply system 10 to the emergency important load 22.

In the present embodiment, the first switch SW1 and the third switch SW3 are modularized as a switch module 241.

The switching device 24 includes a connection line L244 that connects the connection line L241 and the ground line. One end portion of the connection line L244 is connected to a contact C244 formed between the first switch SW1 and the contact C241 on the connection line L241, and the other end portion of the connection line L244 is connected to the ground line. The connection line L244 is provided with a capacitor CP.

The backup low-voltage power supply 23 is, for example, a secondary battery such as a lithium ion battery. The backup low-voltage power supply 23 outputs electric power having a voltage of, for example, 12 [V].

The backup low-voltage power supply 23 is provided on a connection line L213. One end portion of the connection line L213 is connected to the third terminal T243 of the switching device 24, and the other end of the connection line L213 is connected to the ground line. The backup low-voltage power supply 23 is provided on the connection line L213 such that a positive electrode side thereof is on the third terminal T243 side of the switching device 24 and a negative electrode side thereof is on the ground line side.

Therefore, when the second switch SW2 is in the ON state, the backup low-voltage power supply 23 supplies electric power from the connection line L213 to the backup power supply system 20 through the connection line L242 of the switching device 24. At this time, the electric power output from the backup low-voltage power supply 23 is stepped up or stepped down to a desired voltage by the second switch SW2, and is supplied to the backup power supply system 20. On the other hand, when the second switch SW2 is in the OFF state, the connection line L242 of the switching device 24 is in the disconnected state, and thus no electric power is supplied from the backup low-voltage power supply 23 to the backup power supply system 20.

The backup power supply control device 25 includes a processor (not shown) such as a central processing unit (CPU) and a storage medium 25a such as a read only memory (ROM).

The backup power supply control device 25 is operated by, for example, electric power stored in the backup low-voltage power supply 23.

The backup power supply control device 25 controls the first switch SW1, the second switch SW2, and the third switch SW3 of the switching device 24. Specifically, the backup power supply control device 25 switches the ON state and the OFF state of the first switch SW1, the second switch SW2, and the third switch SW3 of the switching device 24. The backup power supply control device 25 is connected to the first switch SW1, the second switch SW2, and the third switch SW3 by signal lines. The backup power supply control device 25 transmits operation signals to the first switch SW1, the second switch SW2, and the third switch SW3 via the signal lines. The operation signals include signals for operating the first switch SW1, the second switch SW2, and the third switch SW3 to switch to the ON state and the OFF state.

In this way, the backup power supply control device 25 can control electric power input to and output from the backup low-voltage power supply 23 by controlling the switching device 24, and can control switching between connection and disconnection of the backup power supply system 20 relative to the main power supply system 10.

The backup power supply control device 25 detects and/or estimates a state of charge (SOC), a state of health (SOH), and the like of the backup low-voltage power supply 23, and thus monitors the state of the backup low-voltage power supply 23.

The backup power supply control device 25 can execute, by a program stored in the storage medium 25a, a supply electrical energy estimation process of estimating suppliable electrical energy W that the backup low-voltage power supply 23 can supply to the emergency important load 22. In addition, the backup power supply control device 25 can execute an autonomous driving availability determination process of determining whether or not the vehicle V is permitted to perform autonomous driving in the hands-off autonomous driving mode or the eyes-off autonomous driving mode based on an estimation result of the supply electrical energy estimation process. Details of the supply electrical energy estimation process and the autonomous driving availability determination process will be described later.

<High-Voltage Power Supply System>

The high-voltage power supply system 30 includes the high-voltage power supply 31 and a high-voltage load 32.

The high-voltage power supply 31 is, for example, a secondary battery such as a lithium ion battery. The high-voltage power supply 31 outputs electric power having a voltage higher than those of the main low-voltage power supply 11 and the backup low-voltage power supply 23. The high-voltage power supply 31 outputs electric power having a voltage of, for example, 200 [V].

The high-voltage power supply 31 is connected to a connection line L31. One end portion of the connection line L31 is connected to the ground line, and a negative electrode side of the high-voltage power supply 31 is connected to the ground line side of the connection line L31.

The high-voltage load 32 operates at a voltage higher than those of the normal load 12 and the emergency important load 22. In the present embodiment, the high-voltage load 32 includes the drive unit 321 that drives the vehicle V and an air conditioner 322 that adjusts a temperature inside a vehicle cabin of the vehicle V.

The drive unit 321 includes the rotary electric machine MG that generates power for driving the vehicle V, and a power control unit PCU that controls the rotary electric machine MG. The power control unit PCU includes a DC-to-DC converter, an inverter, and the like.

The drive unit 321 is connected to the other end of the connection line L31. The high-voltage power supply 31 can supply electric power to the drive unit 321. The drive unit 321 converts DC power supplied from the high-voltage power supply 31 into three-phase AC power by the power control unit PCU, and supplies the three-phase AC power to the rotary electric machine MG. Accordingly, the rotary electric machine MG generates the power for driving the vehicle V by the electric power of the high-voltage power supply 31. In addition, the drive unit 321 may generate three-phase AC power by the rotary electric machine MG during braking of the vehicle V, and convert the three-phase AC power into DC power by the power control unit PCU so as to charge the high-voltage power supply 31.

The air conditioner 322 is connected to a connection line L32 connected to the connection line L31 at a contact C31 formed between the high-voltage power supply 31 and the drive unit 321 on the connection line L31. The air conditioner 322 is operated by the electric power of the high-voltage power supply 31.

<Step-Down Device>

The step-down device 40 is provided on a connection line L40. One end portion of the connection line L40 is connected to a contact C32 formed between the high-voltage power supply 31 and the contact C31 on the connection line L31, and the other end portion of the connection line L40 is connected to a contact C12 formed between the contact C11 on the connection line L10 and the other end portion of the connection line L10 (that is, the first external connection terminal T211 of the backup power supply unit 21 of the backup power supply system 20).

In this way, the high-voltage power supply system 30 is connected to the main power supply system 10 and the backup power supply system 20 via the step-down device 40.

The step-down device 40 steps down electric power flowing through the high-voltage power supply system 30. The step-down device 40 is, for example, a DC-to-DC converter. Therefore, a voltage of the electric power flowing through the high-voltage power supply system 30 is stepped down by the step-down device 40, and the electric power can be supplied to the main power supply system 10 and the backup power supply system 20.

Further, the step-down device 40 can be switched between a connected state and a disconnected state. When the step-down device 40 is in the connected state, the high-voltage power supply system 30 is connected to the main power supply system 10 and the backup power supply system 20 via the connection line L40 and the step-down device 40. When the step-down device 40 is in the disconnected state, the high-voltage power supply system 30 is disconnected from the main power supply system 10 and the backup power supply system 20.

Therefore, the vehicle power supply system 1 can supply electric power from the high-voltage power supply system 30 to the normal load 12 of the main power supply system 10 and the emergency important load 22 of the backup power supply system 20 via the step-down device 40 even when remaining electrical energy of the main low-voltage power supply 11 of the main power supply system 10 and the backup low-voltage power supply 23 of the backup power supply system 20 are depleted. Accordingly, the vehicle power supply system 1 can operate the normal load 12 of the main power supply system 10 and the emergency important load 22 of the backup power supply system 20 even when the remaining electrical energy of the main low-voltage power supply 11 of the main power supply system 10 and the backup low-voltage power supply 23 of the backup power supply system 20 are depleted.

In addition, in the vehicle power supply system 1, the main low-voltage power supply 11 of the main power supply system 10 can be charged with electric power of the high-voltage power supply 31 of the high-voltage power supply system 30 via the step-down device 40. Accordingly, it is possible to prevent the remaining electrical energy of the main low-voltage power supply 11 of the main power supply system 10 from being depleted.

In addition, the vehicle power supply system 1 can charge the backup low-voltage power supply 23 of the backup power supply system 20 with electric power of the high-voltage power supply 31 of the high-voltage power supply system 30 via the step-down device 40. Specifically, the backup power supply control device 25 controls at least one of the first switch SW1 and the third switch SW3 to be switched to the ON state and controls the second switch SW2 to be switched to the ON state, so that electric power of the high-voltage power supply 31 of the high-voltage power supply system 30 can be used to charge the backup low-voltage power supply 23 of the backup power supply system 20 via the step-down device 40. Accordingly, it is possible to prevent the remaining electrical energy of the backup low-voltage power supply 23 of the backup power supply system 20 from being depleted.

[Operation of Vehicle Power Supply System]

Next, an operation of the vehicle power supply system 1 will be described with reference to FIGS. 2 and 3.

In the present specification and the like, an ON state of the vehicle power supply system 1 refers to a state in which an ON operation is performed on the vehicle power supply system 1, a drive source of the vehicle V is activated, and electric power necessary for driving the vehicle V is supplied to auxiliary machines necessary for traveling, and refers to a state in which the vehicle V is traveling or a state in which the vehicle V can immediately travel. In the present embodiment, the ON state of the vehicle power supply system 1 refers to a state in which the drive unit 321 is activated and the normal load 12 and the emergency important load 22 are activated. The ON operation on the vehicle power supply system 1 refers to, for example, an ON operation performed on a power switch (not shown) provided in the vehicle V by an operator of the vehicle V. In a case where the vehicle V includes an internal combustion engine, the ON state of the vehicle power supply system 1 may refer to a state in which the internal combustion engine is activated and the normal load 12 and the emergency important load 22 are activated. In addition, in the case where the vehicle V includes the internal combustion engine, the ON operation on the vehicle power supply system 1 may be, for example, an ON operation performed on an ignition power supply switch provided in the vehicle V by the operator of the vehicle V.

On the other hand, an OFF state of the vehicle power supply system 1 refers to a state in which an OFF operation is performed on the vehicle power supply system 1, the drive source of the vehicle V is not activated, and the electric power necessary for driving the vehicle V is not supplied to the auxiliary machines necessary for traveling. In the present embodiment, the OFF state of the vehicle power supply system 1 refers to a state in which the high-voltage load 32 including the drive unit 321 is not activated, the normal load 12 and the emergency important load 22 are not activated, and standby electric power is supplied to the normal load 12 and the emergency important load 22. The OFF operation on the vehicle power supply system 1 refers to, for example, an OFF operation performed on the power switch (not shown) provided in the vehicle V by the operator of the vehicle V. In the case where the vehicle V includes the internal combustion engine, the OFF state of the vehicle power supply system 1 may refer to a state in which the internal combustion engine is not activated, the normal load 12 and the emergency important load 22 are not activated, and the standby electric power is supplied to the normal load 12 and the emergency important load 22. In addition, in the case where the vehicle V includes the internal combustion engine, the OFF operation on the vehicle power supply system 1 may be, for example, an OFF operation performed on the ignition power supply switch provided in the vehicle V by the operator of the vehicle V.

<Autonomous Driving Availability Determination Flow when Vehicle Power Supply System is in ON State>

Figure 2:
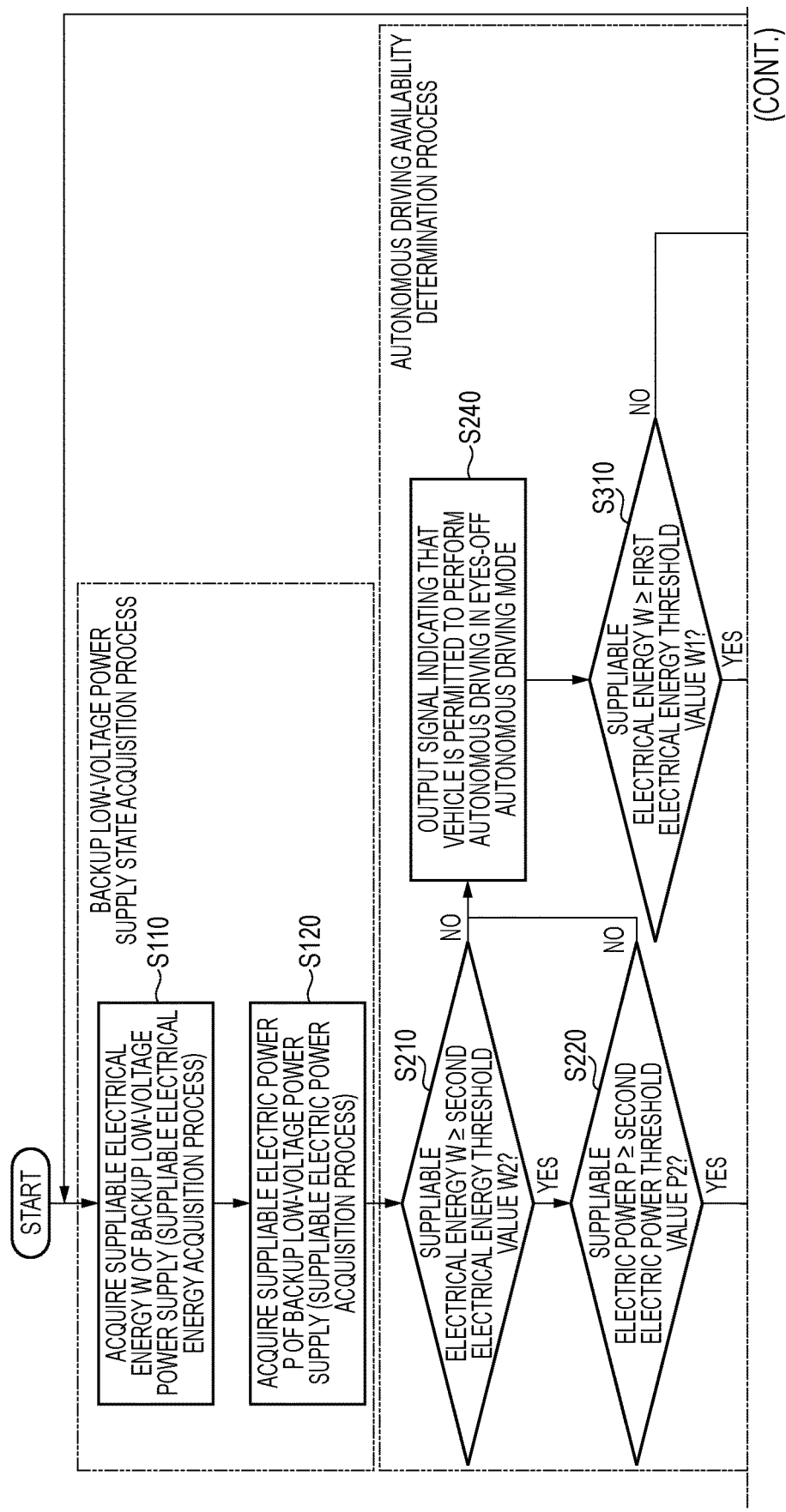
FIG. 2 is a flowchart showing an example of an autonomous driving availability determination flow when the vehicle power supply system according to the embodiment of the present invention is in an ON state.

As shown in FIG. 2, when the ON operation is performed on the vehicle power supply system 1 and the vehicle power supply system 1 is in the ON state, the vehicle power supply system 1 executes an autonomous driving availability determination flow described below. The flow of the vehicle power supply system 1 described below is implemented by, for example, executing a program stored in advance in the storage medium 25a of the backup power supply control device 25.

When the ON operation is performed on the vehicle power supply system 1 and the vehicle power supply system 1 is in the ON state, the backup power supply control device 25 executes a backup low-voltage power supply state acquisition process of acquiring the state of the backup low-voltage power supply 23.

In the backup low-voltage power supply state acquisition process, the backup power supply control device 25 first executes a suppliable electrical energy acquisition process to acquire the suppliable electrical energy W [Wh] of the backup low-voltage power supply 23 (step S110).

For example, in the suppliable electrical energy acquisition process, first, an open circuit voltage (OCV) of the backup low-voltage power supply 23 acquired without electrically connecting the backup low-voltage power supply 23 to the load is detected. The storage medium 25a of the backup power supply control device 25 stores an SOC-OCV curve that plots a relationship between the open circuit voltage (OCV) and the state of charge (SOC) indicating discharge characteristics of the backup low-voltage power supply 23. In the suppliable electrical energy acquisition process, subsequently, the state of charge (SOC) of the backup low-voltage power supply 23 is estimated based on the detected open circuit voltage (OCV) of the backup low-voltage power supply 23 and the SOC-OCV curve stored in the storage medium 25a of the backup power supply control device 25, and the suppliable electrical energy W [Wh] that can be supplied by the backup low-voltage power supply 23 is calculated based on the state of charge (SOC) of the backup low-voltage power supply 23. In this way, in step S110, the suppliable electrical energy W [Wh] of the backup low-voltage power supply 23 is acquired by executing the suppliable electrical energy acquisition process. It should be noted that a close circuit voltage (CCV) of the backup low-voltage power supply 23 acquired by electrically connecting the backup low-voltage power supply 23 to the load may be detected, and the open circuit voltage (OCV) of the backup low-voltage power supply 23 may be estimated based on the close circuit voltage of the backup low-voltage power supply 23. In an ideal power supply, the open circuit voltage (OCV) and the close circuit voltage (CCV) coincide with each other. However, in general, in an actual power supply such as a battery, the close circuit voltage (CCV) is smaller than the open circuit voltage (OCV) due to internal resistance and capacitance. That is, the close circuit voltage (CCV) is smaller than the open circuit voltage (OCV) due to loss caused by the internal resistance and the capacitance.

Following the suppliable electrical energy acquisition process in step S110, the backup power supply control device 25 executes a suppliable electric power acquisition process to acquire a suppliable electric power P [W] of the backup low-voltage power supply 23 (step S120).

For example, in the suppliable electric power acquisition process, first, the close circuit voltage (CCV) of the backup low-voltage power supply 23 is detected. As described above, the value of the close circuit voltage (CCV) is smaller than the value of the open circuit voltage (OCV) by the loss caused by the internal resistance and the capacitance of the backup low-voltage power supply 23. Further, at a low temperature, the loss caused by the internal resistance and the capacitance of the backup low-voltage power supply 23 increases, and thus the value of the close circuit voltage (CCV) further becomes a lower value. In addition, as deterioration of the backup low-voltage power supply 23 progresses, the loss caused by the internal resistance and the capacitance of the backup low-voltage power supply 23 increases, and thus the value of the close circuit voltage (CCV) further becomes a lower value. In the suppliable electric power acquisition process, subsequently, the suppliable electric power P [W] of the backup low-voltage power supply 23 is calculated based on the detected close circuit voltage (CCV) of the backup low-voltage power supply 23. In this way, in step S120, the suppliable electric power P [W] of the backup low-voltage power supply 23 is acquired by executing the suppliable electric power acquisition process.

When the suppliable electric power estimation process (step S120) is completed, the backup power supply control device 25 executes an autonomous driving availability determination process (steps S210 to S340) of determining whether or not the vehicle V is permitted to perform autonomous driving in the hands-off autonomous driving mode or the eyes-off autonomous driving mode.

The storage medium 25a of the backup power supply control device 25 stores a first electric power threshold value P1 that is electric power equal to or greater than electric power necessary for operating the emergency important load 22 when the vehicle V performs autonomous driving in the hands-off autonomous driving mode, and a second electric power threshold value P2 that is electric power equal to or greater than electric power necessary for operating the emergency important load 22 when the vehicle V performs autonomous driving in the eyes-off autonomous driving mode.

In addition, the storage medium 25a of the backup power supply control device 25 stores a first electrical energy threshold value W1 that is electrical energy equal to or greater than electrical energy necessary for operating the emergency important load 22 when the vehicle V performs autonomous driving in the hands-off autonomous driving mode, and a second electrical energy threshold value W2 that is electrical energy equal to or greater than electrical energy necessary for operating the emergency important load 22 when the vehicle V performs autonomous driving in the eyes-off autonomous driving mode.

The hands-off autonomous driving mode is executed such that exemption from a steering operation performed by the driver of the vehicle V is permitted while exemption from constant monitoring of a driving condition of the vehicle and a surrounding condition of the vehicle performed by the driver of the vehicle V is prohibited. Therefore, when the vehicle V performs autonomous driving in the hands-off autonomous driving mode, the driver of the vehicle V constantly monitors the driving condition of the vehicle and the surrounding condition of the vehicle. Therefore, even when an abnormality occurs in the main power supply system 10 of the vehicle power supply system 1, the driver of the vehicle V can return to a driving operation in a short time. At this time, the vehicle V is required to be capable of continuing the autonomous driving in the hands-off autonomous driving mode by electric power stored in the backup low-voltage power supply 23 of the backup power supply system 20 until the driver of the vehicle V returns to the driving operation.

Therefore, when the vehicle V performs autonomous driving in the hands-off autonomous driving mode, the suppliable electric power P that can be supplied from the backup low-voltage power supply 23 to the emergency important load 22 is required to be equal to or greater than electric power by which the minimum necessary emergency important load 22 can operate so as to continue the autonomous driving of the vehicle V in the hands-off autonomous driving mode. In addition, when the vehicle V performs autonomous driving in the hands-off autonomous driving mode, the suppliable electrical energy W that can be supplied from the backup low-voltage power supply 23 to the emergency important load 22 is required to be equal to or greater than electrical energy by which the minimum necessary emergency important load 22 can operate for a predetermined time so as to continue the autonomous driving of the vehicle V in the hands-off autonomous driving mode. The minimum necessary emergency important load 22 for the vehicle V to continue autonomous driving in the hands-off autonomous driving mode includes, for example, the emergency important load 22 that performs forward recognition of the vehicle V, such as a camera, the emergency important load 22 that performs vehicle state recognition of the vehicle V, the emergency important load 22 that performs a steering operation of the vehicle V, and the emergency important load 22 that notifies the driver of the vehicle V that an abnormality occurs in the main power supply system 10 of the vehicle power supply system 1.

Therefore, the first electric power threshold value P1 is a value equal to or greater than the electric power by which the minimum necessary emergency important load 22 for the vehicle V to continue the autonomous driving in the hands-off autonomous driving mode can operate, and is, for example, 150 [W]. In addition, the first electrical energy threshold value W1 is a value equal to or greater than the electrical energy by which the minimum necessary emergency important load 22 for the vehicle V to continue the autonomous driving in the hands-off autonomous driving mode can operate for the predetermined time, and is, for example, 0.8 [Wh].

On the other hand, the eyes-off autonomous driving mode is executed such that the exemption from the steering operation performed by the driver of the vehicle V is permitted and the exemption from the constant monitoring of the driving condition of the vehicle and the surrounding condition of the vehicle performed by the driver of the vehicle V is also permitted. Therefore, when the vehicle V performs autonomous driving in the eyes-off autonomous driving mode, the driver of the vehicle V does not constantly monitor the driving condition of the vehicle and the surrounding condition of the vehicle. Therefore, when an abnormality occurs in the main power supply system 10 of the vehicle power supply system 1, the driver of the vehicle V may not be able to return to the driving operation in a short time. At this time, the vehicle V is required to perform autonomous driving by the electric power stored in the backup low-voltage power supply 23 of the backup power supply system 20, and to perform a minimum necessary traveling operation, a minimum necessary stopping operation, and minimum necessary driving control, namely emergency stop assist (ESA), in order to safely move the vehicle V to a road shoulder of a road and stop the vehicle V.

Therefore, when the vehicle V performs autonomous driving in the eyes-off autonomous driving mode, the suppliable electric power P that can be supplied from the backup low-voltage power supply 23 to the emergency important load 22 is required to be equal to or greater than electric power by which the minimum necessary emergency important load 22 can operate so as to autonomously drive the vehicle V, safely move the vehicle V to the road shoulder of the road, and stop the vehicle V. In addition, when the vehicle V performs autonomous driving in the eyes-off autonomous driving mode, the suppliable electrical energy W that can be supplied from the backup low-voltage power supply 23 to the emergency important load 22 is required to be equal to or greater than the electrical energy by which the minimum necessary emergency important load 22 can operate so as to autonomously drive the vehicle V, safely move the vehicle V to the road shoulder of the road, and stop the vehicle V until the vehicle V is autonomously driven, safely moved to the road shoulder of the road and stopped. The minimum necessary emergency important load 22 for the vehicle V to continue the autonomous driving in the eyes-off autonomous driving mode includes, for example, the emergency important load 22 that perform high-accuracy external recognition of the vehicle V, such as a camera and a LiDAR, the emergency important load 22 that performs vehicle state recognition of the vehicle V, the emergency important load 22 that performs the steering operation of the vehicle V, the emergency important load 22 that performs a braking operation of the vehicle V, and the emergency important load 22 that notify the driver of the vehicle V of a driving handover request.

Therefore, the second electric power threshold value P2 is a value equal to or greater than the electric power by which the minimum necessary emergency important load 22 for autonomously driving the vehicle V, safely moving the vehicle V to the road shoulder of the road, and stopping the vehicle V can operate. For example, the emergency important load 22 that performs the braking operation of the vehicle V requires more electric power as the vehicle V is braked with a greater braking force when the vehicle V is braked. The second electric power threshold value P2 is required to be a value equal to or greater than maximum necessary electric power for operating the minimum necessary emergency important load 22, autonomously driving the vehicle V, safely moving the vehicle V to the road shoulder of the road, and stopping the vehicle V. The second electric power threshold value P2 is, for example, 900 [W]. In addition, the second electrical energy threshold value W2 is a value equal to or greater than electrical energy necessary for operating the minimum necessary emergency important load 22, autonomously driving the vehicle V, safely moving the vehicle V to the road shoulder of the road, and stopping the vehicle V, and is, for example, 4.5 [Wh].

In this way, the second electrical energy threshold value W2, which is electrical energy equal to or greater than the electrical energy necessary for operating the emergency important load 22 when the vehicle V performs autonomous driving in the eyes-off autonomous driving mode, is a value greater than the first electrical energy threshold value W1, which is electrical energy equal to or greater than the electrical energy necessary for operating the emergency important load 22 when the vehicle V performs autonomous driving in the hands-off autonomous driving mode.

In addition, the second electric power threshold value P2, which is electric power equal to or greater than the electric power necessary for operating the emergency important load 22 when the vehicle V performs autonomous driving in the eyes-off autonomous driving mode, is a value greater than the first electric power threshold value P1, which is electric power equal to or greater than the electric power necessary for operating the emergency important load 22 when the vehicle V performs autonomous driving in the hands-off autonomous driving mode.

In the autonomous driving availability determination process, the backup power supply control device 25 first determines whether or not the suppliable electrical energy W estimated in the suppliable electrical energy estimation process (step S110) is equal to or greater than the second electrical energy threshold value W2 (step S210).

When the suppliable electrical energy W estimated in the suppliable electrical energy estimation process (step S110) is equal to or greater than the second electrical energy threshold value W2 (step S210: YES), the backup power supply control device 25 proceeds to step S220.

When the suppliable electrical energy W estimated in the suppliable electrical energy estimation process (step S110) is less than the second electrical energy threshold value W2 (step S210: NO), the backup power supply control device 25 proceeds to step S240, outputs a signal indicating that the vehicle V is prohibited from performing autonomous driving in the eyes-off autonomous driving mode, and proceeds to step S310.

In step S220, the backup power supply control device 25 determines whether or not the suppliable electric power P estimated in the suppliable electric power estimation process (step S120) is equal to or greater than the second electric power threshold value P2.

When the suppliable electric power P estimated in the suppliable electric power estimation process (step S120) is equal to or greater than the second electric power threshold value P2 (step S220: YES), the backup power supply control device 25 proceeds to step S230, outputs a signal indicating that the vehicle V is permitted to perform autonomous driving in the eyes-off autonomous driving mode, ends the autonomous driving availability determination process, and proceeds to step S410.

On the other hand, even when the suppliable electrical energy W of the backup low-voltage power supply 23 acquired by the suppliable electrical energy acquisition process in step S110 is equal to or greater than the second electrical energy threshold value W2, the suppliable electric power P of the backup low-voltage power supply 23 acquired by the suppliable electric power acquisition process in step S120 may be less than the second electric power threshold value P2 due to an influence of a temperature or a state of health (SOH) of the backup low-voltage power supply 23.

When the suppliable electric power P estimated in the suppliable electric power estimation process (step S120) is less than the second electric power threshold value P2 (step S220: NO), the backup power supply control device 25 proceeds to step S240, outputs the signal indicating that the vehicle V is prohibited from performing autonomous driving in the eyes-off autonomous driving mode, and proceeds to step S310.

In step S310, the backup power supply control device 25 determines whether or not the suppliable electrical energy W estimated in the suppliable electrical energy estimation process (step S110) is equal to or greater than the first electrical energy threshold value W1.

When the suppliable electrical energy W estimated in the suppliable electrical energy estimation process (step S110) is equal to or greater than the first electrical energy threshold value W1 (step S310: YES), the backup power supply control device 25 proceeds to step S320.

When the suppliable electrical energy W estimated in the suppliable electrical energy estimation process (step S110) is less than the first electrical energy threshold value W1 (step S310: NO), the backup power supply control device 25 proceeds to step S340, outputs a signal indicating that the vehicle V is prohibited from performing autonomous driving in the hands-off autonomous driving mode, ends the autonomous driving availability determination process, and proceeds to step S410.

In step S320, the backup power supply control device 25 determines whether or not the suppliable electric power P estimated in the suppliable electric power estimation process (step S120) is equal to or greater than the first electric power threshold value P1.

When the suppliable electric power P estimated in the suppliable electric power estimation process (step S120) is equal to or greater than the first electric power threshold value P1 (step S320: YES), the backup power supply control device 25 proceeds to step S330, outputs a signal indicating that the vehicle V is permitted to perform autonomous driving in the hands-off autonomous driving mode, ends the autonomous driving availability determination process, and proceeds to step S410.

When the suppliable electric power P estimated in the suppliable electric power estimation process (step S120) is less than the first electric power threshold value P1 (step S320: NO), the backup power supply control device 25 proceeds to step S340, outputs the signal indicating that the vehicle V is prohibited from performing autonomous driving in the hands-off autonomous driving mode, ends the autonomous driving availability determination process, and proceeds to step S410.

When the autonomous driving availability determination process ends, the backup power supply control device 25 determines whether or not the OFF operation is performed on the vehicle power supply system 1 in step S410. When the OFF operation is not performed on the vehicle power supply system 1 (step S410: NO), the backup power supply control device 25 returns to step S110, and repeats the autonomous driving availability determination flow until the OFF operation is performed on the vehicle power supply system 1.

When the OFF operation is performed on the vehicle power supply system 1 (step S410: YES), the backup power supply control device 25 ends the flow.

Therefore, when the suppliable electrical energy W estimated in the suppliable electrical energy estimation process (step S110) is equal to or greater than the second electrical energy threshold value W2 and the suppliable electric power P estimated in the suppliable electric power estimation process (step S120) is equal to or greater than the second electric power threshold value P2, the backup power supply control device 25 outputs the signal indicating that the vehicle V is permitted to perform autonomous driving in the eyes-off autonomous driving mode (step S230), and when the suppliable electrical energy W estimated in the suppliable electrical energy estimation process (step S110) is equal to or greater than the first electrical energy threshold value W1 and the suppliable electric power P estimated in the suppliable electric power estimation process (step S120) is equal to or greater than the first electric power threshold value P1, the backup power supply control device 25 outputs the signal indicating that the vehicle V is permitted to perform autonomous driving in the hands-off autonomous driving mode (step S330).

In this way, a condition under which the vehicle is permitted to perform autonomous driving in the eyes-off autonomous driving mode and a condition under which the vehicle is permitted to perform autonomous driving in the hands-off autonomous driving mode are separated from each other. Accordingly, even when the suppliable electrical energy W and the suppliable electric power P of the backup low-voltage power supply 23 are not values at which the vehicle V can perform autonomous driving in both the eyes-off autonomous driving mode and the hands-off autonomous driving mode, the backup power supply control device 25 can individually permit autonomous driving of the vehicle V in the eyes-off autonomous driving mode and autonomous driving of the vehicle V in the hands-off autonomous driving mode according to the suppliable electrical energy W and the suppliable electric power P of the backup low-voltage power supply 23.

In the present embodiment, even when the suppliable electrical energy W and the suppliable electric power P of the backup low-voltage power supply 23 are not values at which the vehicle V can perform autonomous driving in the eyes-off autonomous driving mode, the backup power supply control device 25 can permit the vehicle V to perform autonomous driving in the hands-off autonomous driving mode when the suppliable electrical energy W and the suppliable electric power P of the backup low-voltage power supply 23 are values at which the vehicle V can perform autonomous driving in the hands-off autonomous driving mode.

In addition, since the backup power supply control device 25 repeats the autonomous driving availability determination flow until the OFF operation is performed on the vehicle power supply system 1, the autonomous driving availability determination flow is repeatedly executed when the vehicle power supply system 1 is in the ON state.

Therefore, when the vehicle V performs autonomous driving in the eyes-off autonomous driving mode, the backup power supply control device 25 executes the suppliable electrical energy estimation process (step S110) and the suppliable electric power estimation process (step S120), outputs the signal indicating that the vehicle V is prohibited from performing autonomous driving in the eyes-off autonomous driving mode (step S240) when the suppliable electrical energy W estimated in the suppliable electrical energy estimation process (step S110) is less than the second electrical energy threshold value W2 or the suppliable electric power estimated in the suppliable electric power estimation process (step S120) is less than the second electric power threshold value P2, outputs the signal indicating that the vehicle V is permitted to perform autonomous driving in the hands-off autonomous driving mode (step S330) when the suppliable electrical energy W estimated in the suppliable electrical energy estimation process (step S110) is equal to or greater than the first electrical energy threshold value W1 and the suppliable electric power P estimated in the suppliable electric power estimation process (step S120) is equal to or greater than the first electric power threshold value P1, and outputs the signal indicating that the vehicle V is prohibited from performing autonomous driving in the hands-off autonomous driving mode (step S340) when the suppliable electrical energy W estimated in the suppliable electrical energy estimation process (step S110) is less than the first electrical energy threshold value W1 or the suppliable electric power P estimated in the suppliable electric power estimation process (step S120) is less than the first electric power threshold value P1.

Accordingly, when the vehicle V performs autonomous driving in the eyes-off autonomous driving mode, if the suppliable electrical energy W and the suppliable electric power P of the backup low-voltage power supply 23 transition to values at which the vehicle V cannot perform autonomous driving in the eyes-off autonomous driving mode, and if the suppliable electrical energy W and the suppliable electric power P of the backup low-voltage power supply 23 are values at which the vehicle V can perform autonomous driving in the hands-off autonomous driving mode, the vehicle V is not prohibited from performing autonomous driving, and the vehicle V can be permitted to perform autonomous driving in the hands-off autonomous driving mode.

In addition, when the vehicle V performs autonomous driving in the hands-off autonomous driving mode, the backup power supply control device 25 executes the suppliable electrical energy estimation process (step S110) and the suppliable electric power estimation process (step S120), outputs the signal indicating that the vehicle V is permitted to perform autonomous driving in the eyes-off autonomous driving mode (step S230) when the suppliable electrical energy W estimated in the suppliable electrical energy estimation process (step S110) is equal to or greater than the second electrical energy threshold value W2 and the suppliable electric power estimated in the suppliable electric power estimation process (step S120) is equal to or greater than the second electric power threshold value P2, and outputs the signal indicating that the vehicle V is prohibited from performing autonomous driving in the hands-off autonomous driving mode (step S340) when the suppliable electrical energy W estimated in the suppliable electrical energy estimation process (step S110) is less than the first electrical energy threshold value W1 or the suppliable electric power P estimated in the suppliable electric power estimation process (step S120) is less than the first electric power threshold value P1.

Accordingly, when the vehicle V performs autonomous driving in the hands-off autonomous driving mode, if the suppliable electrical energy W and the suppliable electric power P of the backup low-voltage power supply 23 transition to values at which the vehicle V can perform autonomous driving in the eyes-off autonomous driving mode, the vehicle V can be permitted to transition from the hands-off autonomous driving mode to the eyes-off autonomous driving mode and to perform autonomous driving. In addition, when the vehicle V performs autonomous driving in the hands-off autonomous driving mode, if the suppliable electrical energy W and the suppliable electric power P of the backup low-voltage power supply 23 transition to values at which the vehicle V cannot perform autonomous driving in the hands-off autonomous driving mode, the vehicle V can be prohibited from performing autonomous driving in the hands-off autonomous driving mode.

In addition, even when the suppliable electrical energy W of the backup low-voltage power supply 23 acquired by the suppliable electrical energy acquisition process in step S110 is equal to or greater than the first electrical energy threshold value W1, the suppliable electric power P of the backup low-voltage power supply 23 acquired by the suppliable electric power acquisition process in step S120 may be less than the first electric power threshold value Pt due to an influence of the temperature or the state of health (SOH) of the backup low-voltage power supply 23. When the suppliable electrical energy W of the backup low-voltage power supply 23 is equal to or greater than the first electrical energy threshold value W1 and the suppliable electric power P of the backup low-voltage power supply 23 is equal to or greater than the first electric power threshold value P1, the backup power supply control device 25 outputs the signal indicating that the vehicle V is permitted to perform autonomous driving in the hands-off autonomous driving mode, so that the autonomous driving in the hands-off autonomous driving mode can be more reliably continued by the electric power stored in the backup low-voltage power supply 23 of the backup power supply system 20 even when an abnormality occurs in the main power supply system 10 of the vehicle power supply system 1.

Similarly, even when the suppliable electrical energy W of the backup low-voltage power supply 23 acquired by the suppliable electrical energy acquisition process in step S110 is equal to or greater than the second electrical energy threshold value W2, the suppliable electric power P of the backup low-voltage power supply 23 acquired by the suppliable electric power acquisition process in step S120 may be less than the second electric power threshold value P2 due to an influence of the temperature or the state of health (SOH) of the backup low-voltage power supply 23. When the suppliable electrical energy W of the backup low-voltage power supply 23 is equal to or greater than the second electrical energy threshold value W2 and the suppliable electric power P of the backup low-voltage power supply 23 is equal to or greater than the second electric power threshold value P2, the backup power supply control device 25 outputs the signal indicating that the vehicle V is permitted to perform autonomous driving in the eyes-off autonomous driving mode, so that the minimum necessary traveling operation, the minimum necessary stopping operation, and the minimum necessary driving control, namely the emergency stop assist (ESA), can be more reliably performed in order to perform autonomous driving with the electric power stored in the backup low-voltage power supply 23 of the backup power supply system 20, safely move the vehicle V to the road shoulder of the road and stop the vehicle V even when an abnormality occurs in the main power supply system 10 of the vehicle power supply system 1.

<Operation of Vehicle Power Supply System in Normal State when Vehicle Power Supply System is in on State>

Next, an operation of the vehicle power supply system 1 in a normal state when the vehicle power supply system 1 is in the ON state will be described.

When the vehicle power supply system 1 is in the ON state and the vehicle power supply system 1 is in the normal state, the backup power supply control device 25 controls the first switch SW1 to be switched to the ON state, the second switch SW2 to be switched to the OFF state, and the third switch SW3 to be switched to the OFF state. That is, when the vehicle power supply system 1 is in the ON state and the vehicle power supply system 1 is in the normal state, the switching device 24 maintains the first switch SW1 in the ON state, the second switch SW2 in the OFF state, and the third switch SW3 in the OFF state. Accordingly, when the vehicle power supply system 1 is in the ON state, the normal load 12 and the emergency important load 22 are operated by electric power supplied from the main low-voltage power supply 11 when the vehicle power supply system 1 is in the normal state.

<Operation of Vehicle Power Supply System when Abnormality Occurs in Main Power Supply System while Vehicle Power Supply System is in ON State>

Next, an operation of the vehicle power supply system 1 when an abnormality occurs in the main power supply system 10 while the vehicle power supply system 1 is in the ON state will be described with reference to FIG. 3.

A voltage sensor (not shown) that detects an output voltage of the main low-voltage power supply 11 is connected to the main low-voltage power supply 11. The voltage sensor outputs a signal indicating the output voltage of the main low-voltage power supply 11. The signal indicating the output voltage of the main low-voltage power supply 11, which is output from the voltage sensor, may be input to the vehicle control device 50 or may be input to the backup power supply control device 25. When the signal indicating the output voltage of the main low-voltage power supply 11 is input to the backup power supply control device 25, the signal indicating the output voltage of the main low-voltage power supply 11 may be input to the backup power supply control device 25 via the vehicle control device 50 or may be directly input from the voltage sensor to the backup power supply control device 25.

The vehicle power supply system 1 can execute an abnormality determination process of determining whether or not an abnormality occurs in the main power supply system 10. The abnormality determination process may be executed by the vehicle control device 50 or may be executed by the backup power supply control device 25. Here, a control flow in a case where the abnormality determination process is executed by the backup power supply control device 25 will be described as an example.

Figure 3:
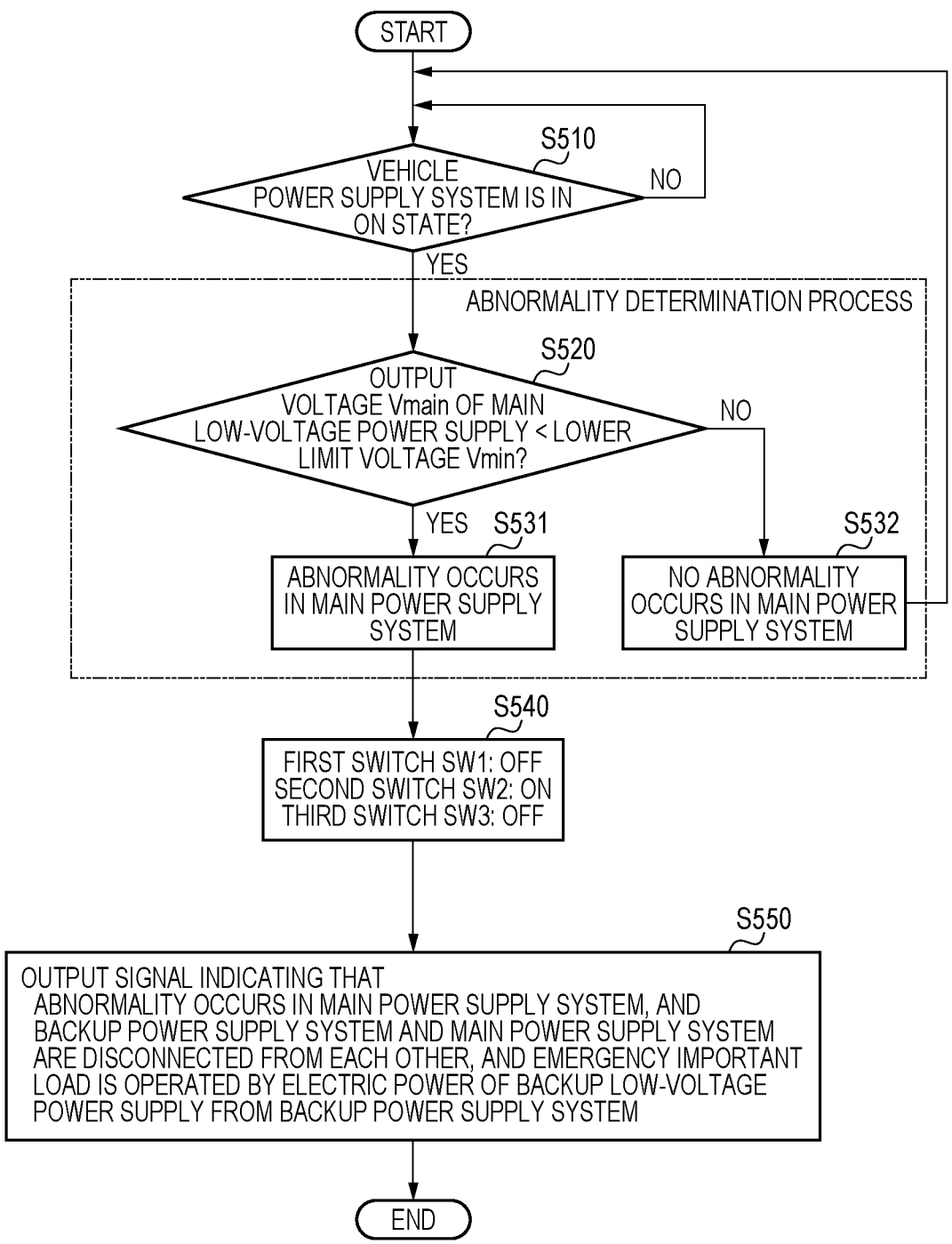
FIG. 3 is a flowchart showing an example of an operation of the vehicle power supply system in a case where an abnormality occurs in a main power supply system when the vehicle power supply system according to the embodiment of the present invention is in the ON state.

As shown in FIG. 3, first, in step S510, it is determined whether or not the vehicle power supply system 1 is in the ON state. When the vehicle power supply system 1 is in the ON state (step S510: YES), the process proceeds to step S520, and the abnormality determination process is executed. On the other hand, when the vehicle power supply system 1 is not in the ON state, that is, when the vehicle power supply system 1 is in the OFF state, the process does not proceed to the abnormality determination process but enters a standby state until the vehicle power supply system 1 enters the ON state (step S510: NO loop) Accordingly, when the vehicle power supply system 1 is in the OFF state, the abnormality determination process is not executed, and power consumption of the vehicle power supply system 1 can be reduced.

In step S520, it is determined whether or not an output voltage Vmain of the main low-voltage power supply 11 is less than a preset lower limit voltage Vmin based on the signal that is input to the backup power supply control device 25 and indicates the output voltage of the main low-voltage power supply 11. When the output voltage Vmain of the main low-voltage power supply 11 is not less than the preset lower limit voltage Vmin (step S520: NO), the process proceeds to step S532, where it is determined that no abnormality occurs in the main power supply system 10, and then the process returns to step S510.

If the output voltage Vmain of the main low-voltage power supply 11 is less than the preset lower limit voltage Vmin (step S520: YES), the process proceeds to step S531, where it is determined that an abnormality occurs in the main power supply system 10, and then the process proceeds to step S540.

In step S540, the backup power supply control device 25 performs control such that the first switch SW1 is switched to the OFF state, the second switch SW2 is switched to the ON state, and the third switch SW3 is maintained in the OFF state.

Therefore, when the vehicle power supply system 1 is in the ON state, if the abnormality determination process is executed and it is determined that an abnormality occurs in the main power supply system 10, both the first switch SW1 and the third switch are switched to the OFF state, and thus the main power supply system 10 and the backup power supply system 20 are disconnected from each other. Since the second switch SW2 is in the ON state, the electric power of the backup low-voltage power supply 23 is supplied from the connection line L213 to the backup power supply system 20 through the connection line L242 of the switching device 24. At this time, the electric power output from the backup low-voltage power supply 23 is stepped up or stepped down to the desired voltage by the second switch SW2, and is supplied to the backup power supply system 20. The electric power of the backup low-voltage power supply 23 is supplied from the connection line L21 to the emergency important load 22 through the connection line L241 and the connection line L212.

When step S540 is completed, the process proceeds to step S550, where the backup power supply control device 25 outputs, to the vehicle control device 50, a signal indicating that an abnormality occurs in the main power supply system 10, the backup power supply system 20 and the main power supply system 10 are disconnected from each other, and the emergency important load 22 is operated by the electric power of the backup low-voltage power supply 23 from the backup power supply system 20, and then the series of operations ends.

When the signal indicating that an abnormality occurs in the main power supply system 10, the backup power supply system 20 and the main power supply system 10 are disconnected from each other, and the emergency important load 22 is operated by the electric power of the backup low-voltage power supply 23 from the backup power supply system 20 is input from the backup power supply system 20, the vehicle control device 50 notifies the driver of the vehicle V that an abnormality occurs in the main power supply system 10.

In this way, when the vehicle power supply system 1 is in the ON state, if an abnormality occurs in the main power supply system 10, the backup power supply system 20 is disconnected from the main power supply system 10, and thus the electric power of the backup low-voltage power supply 23 is not supplied to the normal load 12. Accordingly, the emergency important load 22 can be operated while power consumption of the backup low-voltage power supply 23 is reduced.

In addition, the first switch SW1 and the third switch SW3 are semiconductor switches whereas the second switch SW2 is a DC-to-DC converter, so that the second switch SW2 may need a longer time to switch between the ON state and the OFF state than the first switch SW1 and the third switch SW3. However, since the switching device 24 includes the capacitor CP as described above, electric power stored in the capacitor CP is discharged during a period of time from completion of the switching of the first switch SW1 to the OFF state to completion of the switching of the second switch SW2 to the ON state. Therefore, electric power can still be supplied to the emergency important load 22 during the period of time from the completion of the switching of the first switch SW1 to the OFF state to the completion of the switching of the second switch SW2 to the ON state.

Further, when the vehicle power supply system 1 is in the ON state, the abnormality determination process of determining whether or not an abnormality occurs in the main power supply system 10 is executed. Accordingly, the vehicle power supply system 1 can constantly monitor whether or not an abnormality occurs in the main power supply system 10 when the vehicle power supply system 1 is in the ON state, and thus can quickly operate the switching device 24 when an abnormality occurs in the main power supply system 10.

Although an embodiment of the present invention has been described above with reference to the accompanying drawings, it is needless to say that the present invention is not limited to the embodiment. It is apparent that those skilled in the art can conceive of various modifications and alterations within the scope described in the claims, and it is understood that such modifications and alterations naturally fall within the technical scope of the present invention. In addition, the respective constituent elements in the above embodiment may be combined as desired without departing from the gist of the invention.

For example, in the present embodiment, when the suppliable electrical energy W estimated in the suppliable electrical energy estimation process (step S110) is equal to or greater than the second electrical energy threshold value W2 and the suppliable electric power P estimated in the suppliable electric power estimation process (step S120) is equal to or greater than the second electric power threshold value P2, the backup power supply control device 25 outputs the signal indicating that the vehicle V is permitted to perform autonomous driving in the eyes-off autonomous driving mode (step S230). However, the backup power supply control device 25 may omit the suppliable electric power estimation process (step S120) and output the signal indicating that the vehicle V is permitted to perform autonomous driving in the eyes-off autonomous driving mode when the suppliable electrical energy W estimated in the suppliable electrical energy estimation process (step S110) is equal to or greater than the second electrical energy threshold value W2, or may omit the suppliable electrical energy estimation process (step S110) and output the signal indicating that the vehicle V is permitted to perform autonomous driving in the eyes-off autonomous driving mode when the suppliable electric power P estimated in the suppliable electric power estimation process (step S120) is equal to or greater than the second electric power threshold value P2. Accordingly, the autonomous driving availability determination flow when the vehicle power supply system 1 is in the ON state can be simplified.

In addition, in the present embodiment, the backup power supply control device 25 outputs the signal indicating that the vehicle V is permitted to perform autonomous driving in the hands-off autonomous driving mode when the suppliable electrical energy W estimated in the suppliable electrical energy estimation process (step S110) is equal to or greater than the first electrical energy threshold value W1 and the suppliable electric power P estimated in the suppliable electric power estimation process (step S120) is equal to or greater than the first electric power threshold value P1 (step S330). However, the backup power supply control device 25 may omit the suppliable electric power estimation process (step S120) and output the signal indicating that the vehicle V is permitted to perform autonomous driving in the hands-off autonomous driving mode when the suppliable electrical energy W estimated in the suppliable electrical energy estimation process (step S110) is equal to or greater than the first electrical energy threshold value W1, or may omit the suppliable electrical energy estimation process (step S110) and output the signal indicating that the vehicle V is permitted to perform autonomous driving in the hands-off autonomous driving mode when the suppliable electric power P estimated in the suppliable electric power estimation process (step S120) is equal to or greater than the first electric power threshold value P1. Accordingly, the autonomous driving availability determination flow when the vehicle power supply system 1 is in the ON state can be simplified.

In addition, for example, the abnormality determination process of determining whether or not an abnormality occurs in the main power supply system 10 shown in the present embodiment is an example, and the abnormality determination process may determine whether or not an abnormality occurs in the main power supply system 10 by any device and any method as desired. For example, the main power supply system 10 may be provided with a voltage sensor or a current sensor (not shown), estimate a voltage or a current of the main power supply system 10 based on a signal indicating a voltage value or a current value output from the voltage sensor or the current sensor, determine whether or not the voltage or the current of the main power supply system 10 is a value within a predetermined range set in advance, and determine that an abnormality occurs in the main power supply system 10 when the voltage or the current of the main power supply system 10 is not a value within the predetermined range set in advance.

In addition, for example, in the present embodiment, the switching device 24 includes the connection line L243 connected in parallel to the connection line L241, the first switch SW1 is provided on the connection line L241, and the third switch SW3 is provided on the connection line L243. However, the switching device 24 may not include the connection line L243, and instead of the first switch SW1 and the third switch SW3, a changeover switch by which functions of the first switch SW1 and the third switch SW3 of the present embodiment are integrated may be provided on the connection line L241. Specifically, for example, the changeover switch may be a switch including a normally close (N.C.) contact, and the changeover switch may be maintained in an ON state and the connection line L241 may be maintained in a connected state when no operation signal is applied to the changeover switch. Further, the changeover switch may be an electromagnetic switch (for example, an electromagnetic contactor or an electromagnetic switch) in which an operation force is an electromagnetic force, and the changeover switch may be maintained in the ON state and the connection line L241 may be maintained in the connected state when no electromagnetic force is generated by an operation current. In addition, the changeover switch may be, for example, a single semiconductor switch. When it is determined in the abnormality determination process that an abnormality occurs in the main power supply system 10, the changeover switch is switched to an OFF state by the backup power supply control device 25.

In addition, for example, although the second switch SW2 is a DC-to-DC converter in the present embodiment, the second switch SW2 may be capable of switching the connection line L242 between the connected state and the disconnected state. Therefore, the second switch SW2 may be any switch capable of switching the connection line L242 between the connected state and the disconnected state, and may be, for example, a semiconductor switch including a normally open (N.O.) contact or a normally close (N.C.) contact.

For example, although the capacitor CP is provided on the connection line L244 in the switching device 24 in the present embodiment, the capacitor CP may not be provided on the connection line L244 in the switching device 24, for example, in a case where the second switch SW2 can be switched between the ON state and the OFF state in a short time.

In the present specification, at least the following matters are described. Although corresponding constituent elements and the like in the above embodiment are shown in parentheses, the present invention is not limited thereto.

(1) A vehicle power supply system (vehicle power supply system 1) mounted on a vehicle (vehicle V) enabling at least partial autonomous driving in a first autonomous driving mode (hands-off autonomous driving mode) that permits exemption from a steering operation performed by a driver and prohibits exemption from constant monitoring of a driving condition of the vehicle and a surrounding condition of the vehicle performed by the driver, and a second autonomous driving mode (eyes-off autonomous driving mode) that permits the exemption from the steering operation performed by the driver and permits the exemption from the constant monitoring of the driving condition of the vehicle and the surrounding condition of the vehicle performed by the driver, the vehicle power supply system including:

a main power supply system (main power supply system 10) including a main low-voltage power supply (main low-voltage power supply 11) and a normal load (normal load 12); and a backup power supply system (backup power supply system 20) including a backup low-voltage power supply (backup low-voltage power supply 23) and an emergency important load (emergency important load 22) and being connected to the main power supply system, in which the backup power supply system includes a backup power supply control device (backup power supply control device 25) configured to monitor a state of the backup low-voltage power supply and control electric power input to and output from the backup low-voltage power supply, the backup power supply control device is capable of executing a suppliable electrical energy estimation process of estimating suppliable electrical energy (suppliable electrical energy W) suppliable from the backup low-voltage power supply to the emergency important load, the backup power supply control device outputs a signal based on a first electrical energy threshold value (first electrical energy threshold value W1) that is electrical energy equal to or greater than electrical energy necessary for operating the emergency important load when the vehicle performs autonomous driving in the first autonomous driving mode, and a second electrical energy threshold value (second electrical energy threshold value W2) that is electrical energy equal to or greater than electrical energy necessary for operating the emergency important load when the vehicle performs autonomous driving in the second autonomous driving mode, the backup power supply control device outputs, when the suppliable electrical energy estimated in the suppliable electrical energy estimation process is equal to or greater than the first electrical energy threshold value, a signal indicating that the vehicle is permitted to perform autonomous driving in the first autonomous driving mode, and the backup power supply control device outputs, when the suppliable electrical energy estimated in the suppliable electrical energy estimation process is equal to or greater than the second electrical energy threshold value, a signal indicating that the vehicle is permitted to perform autonomous driving in the second autonomous driving mode.

According to (1), a condition under which the vehicle is permitted to perform autonomous driving in the first autonomous driving mode and a condition under which the vehicle is permitted to perform autonomous driving in the second autonomous driving mode are separated from each other. Accordingly, the backup power supply control device can individually permit autonomous driving of the vehicle in the first autonomous driving mode and autonomous driving of the vehicle in the second autonomous driving mode according to the suppliable electrical energy of the backup low-voltage power supply.

(2) The vehicle power supply system according to (1), in which the second electrical energy threshold value is a value greater than the first electrical energy threshold value.

According to (2), even when the suppliable electrical energy of the backup low-voltage power supply is not a value at which the vehicle can perform autonomous driving in the second autonomous driving mode, the backup power supply control device can permit the vehicle to perform autonomous driving in the first autonomous driving mode when the suppliable electrical energy of the backup low-voltage power supply is a value at which the vehicle can perform autonomous driving in the first autonomous driving mode.

(3) The vehicle power supply system according to (2), in which when the vehicle performs autonomous driving in the second autonomous driving mode, the backup power supply control device executes the suppliable electrical energy estimation process, outputs, when the suppliable electrical energy estimated in the suppliable electrical energy estimation process is less than the second electrical energy threshold value, a signal indicating that the vehicle is prohibited from performing autonomous driving in the second autonomous driving mode, outputs, when the suppliable electrical energy estimated in the suppliable electrical energy estimation process is equal to or greater than the first electrical energy threshold value, the signal indicating that the vehicle is permitted to perform autonomous driving in the first autonomous driving mode, and outputs, when the suppliable electrical energy estimated in the suppliable electrical energy estimation process is less than the first electrical energy threshold value, a signal indicating that the vehicle is prohibited from performing autonomous driving in the first autonomous driving mode.

According to (3), when the vehicle performs autonomous driving in the second autonomous driving mode, if the suppliable electrical energy of the backup low-voltage power supply transitions to a value at which the vehicle cannot perform autonomous driving in the second autonomous driving mode, and if the suppliable electrical energy of the backup low-voltage power supply is a value at which the vehicle can perform autonomous driving in the first autonomous driving mode, the vehicle is not prohibited from performing autonomous driving, and the vehicle can be permitted to perform autonomous driving in the first autonomous driving mode.

(4) The vehicle power supply system according to (2) or (3), in which when the vehicle performs autonomous driving in the first autonomous driving mode, the backup power supply control device executes the suppliable electrical energy estimation process, outputs, when the suppliable electrical energy estimated in the suppliable electrical energy estimation process is equal to or greater than the second electrical energy threshold value, a signal indicating that the vehicle is permitted to perform autonomous driving in the second autonomous driving mode, and outputs, when the suppliable electrical energy estimated in the suppliable electrical energy estimation process is less than the first electrical energy threshold value, the signal indicating that the vehicle is prohibited from performing autonomous driving in the first autonomous driving mode.

According to (4), when the vehicle performs autonomous driving in the first autonomous driving mode, if the suppliable electrical energy of the backup low-voltage power supply transitions to a value at which the vehicle can perform autonomous driving in the second autonomous driving mode, the vehicle can be permitted to transition from the first autonomous operation mode to the second autonomous operation mode and perform autonomous driving. In addition, when the vehicle performs autonomous driving in the first autonomous driving mode, if the suppliable electrical energy of the backup low-voltage power supply transitions to a value at which the vehicle cannot perform autonomous driving in the first autonomous driving mode, the vehicle can be prohibited from performing autonomous driving in the first autonomous driving mode.

(5) A vehicle power supply system (vehicle power supply system 1) mounted on a vehicle (vehicle V) enabling at least partial autonomous driving in a first autonomous driving mode (hands-off autonomous driving mode) that permits exemption from a steering operation performed by a driver and prohibits exemption from constant monitoring of a driving condition of the vehicle and a surrounding condition of the vehicle performed by the driver, and a second autonomous driving mode (eyes-off autonomous driving mode) that permits the exemption from the steering operation performed by the driver and permits the exemption from the constant monitoring of the driving condition of the vehicle and the surrounding condition of the vehicle performed by the driver, the vehicle power supply system including:

a main power supply system including a main low-voltage power supply (main low-voltage power supply 11) and a normal load (normal load 12): and a backup power supply system (backup power supply system 20) including a backup low-voltage power supply (backup low-voltage power supply 23) and an emergency important load (emergency important load 22) and being connected to the main power supply system, in which the backup power supply system includes a backup power supply control device (backup power supply control device 25) configured to monitor a state of the backup low-voltage power supply and control electric power input to and output from the backup low-voltage power supply, the backup power supply control device is capable of executing a suppliable electric power estimation process of estimating suppliable electric power (suppliable electric power P) suppliable from the backup low-voltage power supply to the emergency important load, the backup power supply control device outputs a signal based on a first electric power threshold value (first electric power threshold value P1) that is electric power equal to or greater than electric power necessary for operating the emergency important load when the vehicle performs autonomous driving in the first autonomous driving mode, and a second electric power threshold value (second electric power threshold value P2) that is electric power equal to or greater than electric power necessary for operating the emergency important load when the vehicle performs autonomous driving in the second autonomous driving mode, the backup power supply control device outputs, when the suppliable electric power estimated in the suppliable electric power estimation process is equal to or greater than the first electric power threshold value, a signal indicating that the vehicle is permitted to perform autonomous driving in the first autonomous driving mode, and the backup power supply control device outputs, when the suppliable electric power estimated in the suppliable electric power estimation process is equal to or greater than the second electric power threshold value, a signal indicating that the vehicle is permitted to perform autonomous driving in the second autonomous driving mode.

According to (5), the condition under which the vehicle is permitted to perform autonomous driving in the first autonomous driving mode and the condition under which the vehicle is permitted to perform autonomous driving in the second autonomous driving mode are separated from each other. Accordingly, the backup power supply control device can individually permit autonomous driving of the vehicle in the first autonomous driving mode and autonomous driving of the vehicle in the second autonomous driving mode according to the suppliable electric power of the backup low-voltage power supply.

(6) The vehicle power supply system according to (5), in which the second electric power threshold value is a value greater than the first electric power threshold value.

According to (6), even when the suppliable electric power of the backup low-voltage power supply is not a value at which the vehicle can perform autonomous driving in the second autonomous driving mode, the backup power supply control device can permit the vehicle to perform autonomous driving in the first autonomous driving mode when the suppliable electric power of the backup low-voltage power supply is a value at which the vehicle can perform autonomous driving in the first autonomous driving mode.

(7) The vehicle power supply system according to (6), in which when the vehicle performs autonomous driving in the second autonomous driving mode, the backup power supply control device executes the suppliable electric power estimation process, outputs, when the suppliable electric power estimated in the suppliable electric power estimation process is less than the second electric power threshold value, a signal indicating that the vehicle is prohibited from performing autonomous driving in the second autonomous driving mode, outputs, when the suppliable electric power estimated in the suppliable electric power estimation process is equal to or greater than the first electric power threshold value, the signal indicating that the vehicle is permitted to perform autonomous driving in the first autonomous driving mode, and outputs, when the suppliable electric power estimated in the suppliable electric power estimation process is less than the first electric power threshold value, a signal indicating that the vehicle is prohibited from performing autonomous driving in the first autonomous driving mode.

According to (7), when the vehicle performs autonomous driving in the second autonomous driving mode, if the suppliable electric power of the backup low-voltage power supply transitions to a value at which the vehicle cannot perform autonomous driving in the second autonomous driving mode, and if the suppliable electric power of the backup low-voltage power supply is a value at which the vehicle can perform autonomous driving in the first autonomous driving mode, the vehicle is not prohibited from performing autonomous driving, and the vehicle can be permitted to perform autonomous driving in the first autonomous driving mode.

(8) The vehicle power supply system according to (6) or (7), in which when the vehicle performs autonomous driving in the first autonomous driving mode, the backup power supply control device executes the suppliable electric power estimation process, outputs, when the suppliable electric power estimated in the suppliable electric power estimation process is equal to or greater than the second electric power threshold value, a signal indicating that the vehicle is permitted to perform autonomous driving in the second autonomous driving mode, and outputs, when the suppliable electric power estimated in the suppliable electric power estimation process is less than the first electric power threshold value, the signal indicating that the vehicle is prohibited from performing autonomous driving in the first autonomous driving mode.

According to (8), when the vehicle performs autonomous driving in the first autonomous driving mode, if the suppliable electric power of the backup low-voltage power supply transitions to a value at which the vehicle can perform autonomous driving in the second autonomous driving mode, the vehicle can be permitted to transition from the first autonomous operation mode to the second autonomous operation mode and perform autonomous driving. In addition, when the vehicle performs autonomous driving in the first autonomous driving mode, if the suppliable electric power of the backup low-voltage power supply transitions to a value at which the vehicle cannot perform autonomous driving in the first autonomous driving mode, the vehicle can be prohibited from performing autonomous driving in the first autonomous driving mode.

(9) A vehicle power supply system (vehicle power supply system 1) mounted on a vehicle (vehicle V) enabling at least partial autonomous driving in a first autonomous driving mode (hands-off autonomous driving mode) that permits exemption from a steering operation performed by a driver and prohibits exemption from constant monitoring of a driving condition of the vehicle and a surrounding condition of the vehicle performed by the driver, and a second autonomous driving mode (eyes-off autonomous driving mode) that permits the exemption from the steering operation performed by the driver and permits the exemption from the constant monitoring of the driving condition of the vehicle and the surrounding condition of the vehicle performed by the driver, the vehicle power supply system including:

a main power supply system including a main low-voltage power supply (main low-voltage power supply 11) and a normal load (normal load 12): and a backup power supply system (backup power supply system 20) including a backup low-voltage power supply (backup low-voltage power supply 23) and an emergency important load (emergency important load 22) and being connected to the main power supply system, in which the backup power supply system includes a backup power supply control device (backup power supply control device 25) configured to monitor a state of the backup low-voltage power supply and control electric power input to and output from the backup low-voltage power supply, the backup power supply control device is capable of executing a suppliable electrical energy estimation process of estimating suppliable electrical energy (suppliable electrical energy W) suppliable from the backup low-voltage power supply to the emergency important load, and a suppliable electric power estimation process of estimating suppliable electric power (suppliable electric power P) suppliable from the backup low-voltage power supply to the emergency important load, the backup power supply control device outputs a signal based on a first electrical energy threshold value (first electrical energy threshold value W1) that is electrical energy equal to or greater than electrical energy necessary for operating the emergency important load when the vehicle performs autonomous driving in the first autonomous driving mode, a second electrical energy threshold value (second electrical energy threshold value W2) that is electrical energy equal to or greater than electrical energy necessary for operating the emergency important load when the vehicle performs autonomous driving in the second autonomous driving mode, a first electric power threshold value (first electric power threshold value P1) that is electric power equal to or greater than electric power necessary for operating the emergency important load when the vehicle performs autonomous driving in the first autonomous driving mode, and a second electric power threshold value (second electric power threshold value P2) that is electric power equal to or greater than electric power necessary for operating the emergency important load when the vehicle performs autonomous driving in the second autonomous driving mode, the backup power supply control device outputs, when the suppliable electrical energy estimated in the suppliable electrical energy estimation process is equal to or greater than the first electrical energy threshold value and the suppliable electric power estimated in the suppliable electric power estimation process is equal to or greater than the first electric power threshold value, the signal indicating that the vehicle is permitted to perform autonomous driving in the first autonomous driving mode, and the backup power supply control device outputs, when the suppliable electrical energy estimated in the suppliable electrical energy estimation process is equal to or greater than the second electrical energy threshold value and the suppliable electric power estimated in the suppliable electric power estimation process is equal to or greater than the second electric power threshold value, a signal indicating that the vehicle is permitted to perform autonomous driving in the second autonomous driving mode.

According to (9), the condition under which the vehicle is permitted to perform autonomous driving in the first autonomous driving mode and the condition under which the vehicle is permitted to perform autonomous driving in the second autonomous driving mode are separated from each other. Accordingly, the backup power supply control device can individually permit autonomous driving of the vehicle in the first autonomous driving mode and autonomous driving of the vehicle in the second autonomous driving mode according to the suppliable electrical energy and the suppliable electric power of the backup low-voltage power supply.

(10) The vehicle power supply system according to (9), in which the second electrical energy threshold value is a value greater than the first electrical energy threshold value, and the second electric power threshold value is a value greater than the first electric power threshold value.

According to (10), even when the suppliable electrical energy and the suppliable electric power of the backup low-voltage power supply are not values at which the vehicle can perform autonomous driving in the second autonomous driving mode, the backup power supply control device can permit the vehicle to perform autonomous driving in the first autonomous driving mode when the suppliable electrical energy and the suppliable electric power of the backup low-voltage power supply are values at which the vehicle can perform autonomous driving in the first autonomous driving mode.

(11) The vehicle power supply system according to (10), in which when the vehicle performs autonomous driving in the second autonomous driving mode, the backup power supply control device executes the suppliable electrical energy estimation process and the suppliable electric power estimation process, outputs, when the suppliable electrical energy estimated in the suppliable electrical energy estimation process is less than the second electrical energy threshold value or when the suppliable electric power estimated in the suppliable electric power estimation process is less than the second electric power threshold value, a signal indicating that the vehicle is prohibited from performing autonomous driving in the second autonomous driving mode, outputs, when the suppliable electrical energy estimated in the suppliable electrical energy estimation process is equal to or greater than the first electrical energy threshold value and the suppliable electric power estimated in the suppliable electric power estimation process is equal to or greater than the first electric power threshold value, the signal indicating that the vehicle is permitted to perform autonomous driving in the first autonomous driving mode, and outputs, when the suppliable electrical energy estimated in the suppliable electrical energy estimation process is less than the first electrical energy threshold value or the suppliable electric power estimated in the suppliable electric power estimation process is less than the first electric power threshold value, a signal indicating that the vehicle is prohibited from performing autonomous driving in the first autonomous driving mode.

According to (11), when the vehicle performs autonomous driving in the second autonomous driving mode, if the suppliable electrical energy and the suppliable electric power of the backup low-voltage power supply transitions to values at which the vehicle cannot perform autonomous driving in the second autonomous driving mode, and if the suppliable electrical energy and the suppliable electric power of the backup low-voltage power supply are values at which the vehicle can perform autonomous driving in the first autonomous driving mode, the vehicle is not prohibited from performing autonomous driving, and the vehicle can be permitted to perform autonomous driving in the first autonomous driving mode.

(12) The vehicle power supply system according to (10) or (11), in which when the vehicle performs autonomous driving in the first autonomous driving mode, the backup power supply control device executes the suppliable electrical energy estimation process and the suppliable electric power estimation process, outputs, when the suppliable electrical energy estimated in the suppliable electrical energy estimation process is equal to or greater than the second electrical energy threshold value and the suppliable electric power estimated in the suppliable electric power estimation process is equal to or greater than the second electric power threshold value, a signal indicating that the vehicle is permitted to perform autonomous driving in the second autonomous driving mode, and outputs, when the suppliable electrical energy estimated in the suppliable electrical energy estimation process is less than the first electrical energy threshold value or the suppliable electric power estimated in the suppliable electric power estimation process is less than the first electric power threshold value, the signal indicating that the vehicle is prohibited from performing autonomous driving in the first autonomous driving mode.

According to (12), when the vehicle performs autonomous driving in the first autonomous driving mode, if the suppliable electrical energy and the suppliable electric power of the backup low-voltage power supply transition to values at which the vehicle can perform autonomous driving in the second autonomous driving mode, the vehicle can be permitted to transition from the first autonomous operation mode to the second autonomous operation mode and perform autonomous driving. In addition, when the vehicle performs autonomous driving in the first autonomous driving mode, if the suppliable electrical energy and the suppliable electric power of the backup low-voltage power supply transition to values at which the vehicle cannot perform autonomous driving in the first autonomous driving mode, the vehicle can be prohibited from performing autonomous driving in the first autonomous driving mode.

What is claimed is:

1. A vehicle power supply system mounted on a vehicle enabling at least partial autonomous driving in a first autonomous driving mode that permits exemption from a steering operation performed by a driver and prohibits exemption from constant monitoring of a driving condition of the vehicle and a surrounding condition of the vehicle performed by the driver, and a second autonomous driving mode that permits the exemption from the steering operation performed by the driver and permits the exemption from the constant monitoring of the driving condition of the vehicle and the surrounding condition of the vehicle performed by the driver, the vehicle power supply system comprising:

a main power supply system including a main low-voltage power supply and a normal load, and a backup power supply system including a backup low-voltage power supply and an emergency important load and being connected to the main power supply system, wherein the backup power supply system includes a backup power supply control device configured to monitor a state of the backup low-voltage power supply and control electric power input to and output from the backup low-voltage power supply, the backup power supply control device is capable of executing a suppliable electrical energy estimation process of estimating suppliable electrical energy suppliable from the backup low-voltage power supply to the emergency important load, the backup power supply control device outputs a signal based on a first electrical energy threshold value that is electrical energy equal to or greater than electrical energy necessary for operating the emergency important load when the vehicle performs autonomous driving in the first autonomous driving mode, and a second electrical energy threshold value that is electrical energy equal to or greater than electrical energy necessary for operating the emergency important load when the vehicle performs autonomous driving in the second autonomous driving mode, the backup power supply control device outputs, when the suppliable electrical energy estimated in the suppliable electrical energy estimation process is equal to or greater than the first electrical energy threshold value, a signal indicating that the vehicle is permitted to perform autonomous driving in the first autonomous driving mode, and the backup power supply control device outputs, when the suppliable electrical energy estimated in the suppliable electrical energy estimation process is equal to or greater than the second electrical energy threshold value, a signal indicating that the vehicle is permitted to perform autonomous driving in the second autonomous driving mode.

2. The vehicle power supply system according to claim 1, wherein the second electrical energy threshold value is a value greater than the first electrical energy threshold value.

3. The vehicle power supply system according to claim 2, wherein when the vehicle performs autonomous driving in the second autonomous driving mode, the backup power supply control device executes the suppliable electrical energy estimation process, outputs, when the suppliable electrical energy estimated in the suppliable electrical energy estimation process is less than the second electrical energy threshold value, a signal indicating that the vehicle is prohibited from performing autonomous driving in the second autonomous driving mode, outputs, when the suppliable electrical energy estimated in the suppliable electrical energy estimation process is equal to or greater than the first electrical energy threshold value, the signal indicating that the vehicle is permitted to perform autonomous driving in the first autonomous driving mode, and outputs, when the suppliable electrical energy estimated in the suppliable electrical energy estimation process is less than the first electrical energy threshold value, a signal indicating that the vehicle is prohibited from performing autonomous driving in the first autonomous driving mode.

4. The vehicle power supply system according to claim 2, wherein
when the vehicle performs autonomous driving in the first autonomous driving mode, the backup power supply control device executes the suppliable electrical energy estimation process, outputs, when the suppliable electrical energy estimated in the suppliable electrical energy estimation process is equal to or greater than the second electrical energy threshold value, a signal indicating that the vehicle is permitted to perform autonomous driving in the second autonomous driving mode, and outputs, when the suppliable electrical energy estimated in the suppliable electrical energy estimation process is less than the first electrical energy threshold value, the signal indicating that the vehicle is prohibited from performing autonomous driving in the first autonomous driving mode.

5. A vehicle power supply system mounted on a vehicle enabling at least partial autonomous driving in a first autonomous driving mode that permits exemption from a steering operation performed by a driver and prohibits exemption from constant monitoring of a driving condition of the vehicle and a surrounding condition of the vehicle performed by the driver, and a second autonomous driving mode that permits the exemption from the steering operation performed by the driver and permits the exemption from the constant monitoring of the driving condition of the vehicle and the surrounding condition of the vehicle performed by the driver, the vehicle power supply system comprising:
a main power supply system including a main low-voltage power supply and a normal load; and
a backup power supply system including a backup low-voltage power supply and an emergency important load and being connected to the main power supply system, wherein
the backup power supply system includes a backup power supply control device configured to monitor a state of the backup low-voltage power supply and control electric power input to and output from the backup low-voltage power supply,
the backup power supply control device is capable of executing a suppliable electric power estimation process of estimating suppliable electric power suppliable from the backup low-voltage power supply to the emergency important load,
the backup power supply control device outputs a signal based on a first electric power threshold value that is electric power equal to or greater than electric power necessary for operating the emergency important load when the vehicle performs autonomous driving in the first autonomous driving mode, and a second electric power threshold value that is electric power equal to or greater than electric power necessary for operating the emergency important load when the vehicle performs autonomous driving in the second autonomous driving mode,
the backup power supply control device outputs, when the suppliable electric power estimated in the suppliable electric power estimation process is equal to or greater than the first electric power threshold value, a signal indicating that the vehicle is permitted to perform autonomous driving in the first autonomous driving mode, and
the backup power supply control device outputs, when the suppliable electric power estimated in the suppliable electric power estimation process is equal to or greater than the second electric power threshold value, a signal indicating that the vehicle is permitted to perform autonomous driving in the second autonomous driving mode.

6. The vehicle power supply system according to claim 5, wherein
the second electric power threshold value is a value greater than the first electric power threshold value.

7. The vehicle power supply system according to claim 6, wherein
when the vehicle performs autonomous driving in the second autonomous driving mode, the backup power supply control device executes the suppliable electric power estimation process, outputs, when the suppliable electric power estimated in the suppliable electric power estimation process is less than the second electric power threshold value, a signal indicating that the vehicle is prohibited from performing autonomous driving in the second autonomous driving mode, outputs, when the suppliable electric power estimated in the suppliable electric power estimation process is equal to or greater than the first electric power threshold value, the signal indicating that the vehicle is permitted to perform autonomous driving in the first autonomous driving mode, and outputs, when the suppliable electric power estimated in the suppliable electric power estimation process is less than the first electric power threshold value, a signal indicating that the vehicle is prohibited from performing autonomous driving in the first autonomous driving mode.

8. The vehicle power supply system according to claim 6, wherein
when the vehicle performs autonomous driving in the first autonomous driving mode, the backup power supply control device executes the suppliable electric power estimation process, outputs, when the suppliable electric power estimated in the suppliable electric power estimation process is equal to or greater than the second electric power threshold value, a signal indicating that the vehicle is permitted to perform autonomous driving in the second autonomous driving mode, and outputs, when the suppliable electric power estimated in the suppliable electric power estimation process is less than the first electric power threshold value, the signal indicating that the vehicle is prohibited from performing autonomous driving in the first autonomous driving mode.

9. A vehicle power supply system mounted on a vehicle enabling at least partial autonomous driving in a first autonomous driving mode that permits exemption from a steering operation performed by a driver and prohibits exemption from constant monitoring of a driving condition of the vehicle and a surrounding condition of the vehicle performed by the driver, and a second autonomous driving mode that permits the exemption from the steering operation performed by the driver and permits the exemption from the constant monitoring of the driving condition of the vehicle and the surrounding condition of the vehicle performed by the driver, the vehicle power supply system comprising:
a main power supply system including a main low-voltage power supply and a normal load, and
a backup power supply system including a backup low-voltage power supply and an emergency important load and being connected to the main power supply system, wherein
the backup power supply system includes a backup power supply control device configured to monitor a state of the backup low-voltage power supply and control electric power input to and output from the backup low-voltage power supply, the backup power supply control device is capable of executing a suppliable electrical energy estimation process of estimating suppliable electrical energy suppliable from the backup low-voltage power supply to the emergency important load, and a suppliable electric power estimation process of estimating suppliable electric power suppliable from the backup low-voltage power supply to the emergency important load, the backup power supply control device outputs a signal based on a first electrical energy threshold value that is electrical energy equal to or greater than electrical energy necessary for operating the emergency important load when the vehicle performs autonomous driving in the first autonomous driving mode, a second electrical energy threshold value that is electrical energy equal to or greater than electrical energy necessary for operating the emergency important load when the vehicle performs autonomous driving in the second autonomous driving mode, a first electric power threshold value that is electric power equal to or greater than electric power necessary for operating the emergency important load when the vehicle performs autonomous driving in the first autonomous driving mode, and a second electric power threshold value that is electric power equal to or greater than electric power necessary for operating the emergency important load when the vehicle performs autonomous driving in the second autonomous driving mode, the backup power supply control device outputs, when the suppliable electrical energy estimated in the suppliable electrical energy estimation process is equal to or greater than the first electrical energy threshold value and the suppliable electric power estimated in the suppliable electric power estimation process is equal to or greater than the first electric power threshold value, a signal indicating that the vehicle is permitted to perform autonomous driving in the first autonomous driving mode, and the backup power supply control device outputs, when the suppliable electrical energy estimated in the suppliable electrical energy estimation process is equal to or greater than the second electrical energy threshold value and the suppliable electric power estimated in the suppliable electric power estimation process is equal to or greater than the second electric power threshold value, a signal indicating that the vehicle is permitted to perform autonomous driving in the second autonomous driving mode.

10. The vehicle power supply system according to claim 9, wherein
the second electrical energy threshold value is a value greater than the first electrical energy threshold value, and
the second electric power threshold value is a value greater than the first electric power threshold value.

11. The vehicle power supply system according to claim 10, wherein
when the vehicle performs autonomous driving in the second autonomous driving mode, the backup power supply control device executes the suppliable electrical energy estimation process and the suppliable electric power estimation process, outputs, when the suppliable electrical energy estimated in the suppliable electrical energy estimation process is less than the second electrical energy threshold value or when the suppliable electric power estimated in the suppliable electric power estimation process is less than the second electric power threshold value, a signal indicating that the vehicle is prohibited from performing autonomous driving in the second autonomous driving mode, outputs, when the suppliable electrical energy estimated in the suppliable electrical energy estimation process is equal to or greater than the first electrical energy threshold value and the suppliable electric power estimated in the suppliable electric power estimation process is equal to or greater than the first electric power threshold value, the signal indicating that the vehicle is permitted to perform autonomous driving in the first autonomous driving mode, and outputs, when the suppliable electrical energy estimated in the suppliable electrical energy estimation process is less than the first electrical energy threshold value or the suppliable electric power estimated in the suppliable electric power estimation process is less than the first electric power threshold value, a signal indicating that the vehicle is prohibited from performing autonomous driving in the first autonomous driving mode.

12. The vehicle power supply system according to claim 10, wherein
when the vehicle performs autonomous driving in the first autonomous driving mode, the backup power supply control device executes the suppliable electrical energy estimation process and the suppliable electric power estimation process, outputs, when the suppliable electrical energy estimated in the suppliable electrical energy estimation process is equal to or greater than the second electrical energy threshold value and the suppliable electric power estimated in the suppliable electric power estimation process is equal to or greater than the second electric power threshold value, a signal indicating that the vehicle is permitted to perform autonomous driving in the second autonomous driving mode, and outputs, when the suppliable electrical energy estimated in the suppliable electrical energy estimation process is less than the first electrical energy threshold value or the suppliable electric power estimated in the suppliable electric power estimation process is less than the first electric power threshold value, the signal indicating that the vehicle is prohibited from performing autonomous driving in the first autonomous driving mode.

* * * * *